(12) United States Patent
Shim et al.

(10) Patent No.: US 9,722,679 B2
(45) Date of Patent: Aug. 1, 2017

(54) METHOD AND APPARATUS FOR ESTIMATING COMMUNICATION CHANNEL IN MOBILE COMMUNICATION SYSTEM

(71) Applicants: Samsung Electronics Co., Ltd., Gyeonggi-do (KR); Korea University Research and Business Foundation, Seoul (KR)

(72) Inventors: Byonghyo Shim, Seoul (KR); Sunho Park, Seoul (KR); Taeyoung Kim, Gyeonggi-do (KR); Jiyun Seol, Gyeonggi-do (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/609,253

(22) Filed: Jan. 29, 2015

(65) Prior Publication Data
US 2015/0215010 A1    Jul. 30, 2015

(30) Foreign Application Priority Data
Jan. 29, 2014    (KR) .......................... 10-2014-0011055

(51) Int. Cl.
*H04L 25/02*    (2006.01)
*H04B 7/0413*    (2017.01)
(Continued)

(52) U.S. Cl.
CPC ......... *H04B 7/0413* (2013.01); *H04B 7/0851* (2013.01); *H04L 1/005* (2013.01);
(Continued)

(58) Field of Classification Search
CPC .. H04B 17/309; H04B 7/0632; H04B 7/0626; H04B 7/0413; H04L 25/0256; H04L 25/0202; H04L 1/0054
See application file for complete search history.

(56) References Cited

U.S. PATENT DOCUMENTS 4,118,686 A * 10/1978 Lender .......................... 375/292
5,373,507 A * 12/1994 Skold ............................ 370/350
(Continued)

OTHER PUBLICATIONS

International Search Report dated Apr. 30, 2015 in connection with International Application No. PCT/KR2015/000995; 3 pages.

*Primary Examiner* — Jean B Corrielus

(57) ABSTRACT

A method of receiving a signal by a receiver in a mobile communication system is provided. The method includes: receiving a reference signal from a transmitter; determining first channel information based on the received reference signal; receiving a data signal based on the first channel information; and determining second channel information based on the received data signal and the first channel information. Iterative channel estimation is performed to reduce channel estimation errors by determining errors of signals received from a turbo decoding unit and using symbol information as pilots even in subcarriers where the pilot signals are not transmitted, and to increase the accuracy of LLR calculation through an iteration process such as a detection and decoding process in comparison with the conventional technology, thereby increasing the reception performance of the turbo decoding unit and improving communication efficiency.

18 Claims, 21 Drawing Sheets

(51) Int. Cl.
  *H04L 1/00* (2006.01)
  *H04B 7/08* (2006.01)
  *H04L 1/20* (2006.01)

(52) U.S. Cl.
  CPC .............. *H04L 1/0054* (2013.01); *H04L 1/20* (2013.01); *H04L 25/0202* (2013.01)

(56) References Cited

U.S. PATENT DOCUMENTS

| | | | |
|---|---|---|---|
| 5,796,820 A * | 8/1998 | Sasada | 379/406.08 |
| 6,275,525 B1 * | 8/2001 | Bahai et al. | 375/232 |
| 6,459,728 B1 * | 10/2002 | Bar-David et al. | 375/231 |
| 7,986,752 B2 | 7/2011 | Nikopour-Deilami et al. | |
| 8,028,216 B1 * | 9/2011 | Yeo et al. | 714/755 |
| 8,477,884 B2 | 7/2013 | Kim et al. | |
| 8,811,545 B2 | 8/2014 | Annavajjala et al. | |
| 8,831,134 B2 | 9/2014 | Murakami et al. | |
| 2002/0150037 A1 * | 10/2002 | Bao et al. | 370/208 |
| 2004/0013172 A1 * | 1/2004 | Hashiguchi | H04B 1/707 375/148 |
| 2004/0085917 A1 * | 5/2004 | Fitton | H04L 1/0061 370/292 |
| 2004/0174939 A1 * | 9/2004 | Wang | 375/316 |
| 2005/0190868 A1 | 9/2005 | Khandekar et al. | |
| 2006/0198454 A1 * | 9/2006 | Chung et al. | 375/260 |
| 2007/0286313 A1 | 12/2007 | Nikopour-Deilami et al. | |
| 2008/0192842 A1 * | 8/2008 | Fei et al. | 375/260 |
| 2009/0103666 A1 | 4/2009 | Zhao et al. | |
| 2010/0266073 A1 | 10/2010 | Kim et al. | |
| 2011/0007625 A1 * | 1/2011 | Kataoka | 370/208 |
| 2011/0051860 A1 * | 3/2011 | Tang et al. | 375/341 |
| 2011/0173508 A1 * | 7/2011 | Wehinger | 714/748 |
| 2013/0114765 A1 | 5/2013 | Annavajjala et al. | |
| 2013/0121441 A1 | 5/2013 | Murakami et al. | |
| 2013/0272250 A1 * | 10/2013 | Shimezawa | H04B 7/063 370/329 |
| 2014/0153625 A1 * | 6/2014 | Vojcic et al. | 375/224 |

* cited by examiner

METHOD AND APPARATUS FOR ESTIMATING COMMUNICATION CHANNEL IN MOBILE COMMUNICATION SYSTEM

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2014-0011055, filed on Jan. 29, 2014, which is hereby incorporated by reference for all purposes as if fully set forth herein.

TECHNICAL FIELD

The present application relates generally to a method and an apparatus for estimating a communication channel in a mobile communication system, and more particularly to an apparatus and a method for expanding an Iterative Detection and Decoding (IDD) scheme to perform iterative channel estimation, detection, and decoding.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a high speed wireless communication system, the problem of inter-symbol interface occurs. Accordingly, recent systems prefer Code Division Multiple Access (CDMA) or Orthogonal Frequency Division Multiplexing (OFDM) which does not generate the inter-symbol interference problem.

In general, a mobile communication system was developed to provide voice services while guaranteeing user activity. However, currently mobile communication systems have gradually expanded their service area to include data service as well as voice service and have been developed to provide high speed data service. Though, since resources are lacking and users demand higher speed services in the mobile communication system providing a current service, a more improved mobile communication system is needed.

To meet these demands, standardization of Long Term Evolution (LTE) is being progressed by the 3rd Generation Partnership Project (3GPP) as one of the next generation mobile communication systems that are being developed. LTE is a technology implementing high speed packet-based communication having a transmission rate of a maximum of 100 Mbps with the goal being to commercialize LTE in 2010. To this end, several methods are being discussed, including a method of reducing the number of nodes located on a communication channel by simplifying network architecture, and a method of making wireless protocols maximally close to wireless channels, and the like.

A Multiple Input Multiple Output (MIMO) wireless communication system supports a MULTI USER (MU)-MIMO mode to increase a system yield. Particularly, Long Term Evolution-Advanced (LTE-A) considers a transmission mode of up to a maximum of 8 layers.

Data streams corresponding to a maximum of 8 layers are properly allocated to users according to channel states and scheduling schemes of the users, and support from a Single User (SU)-MIMO mode to the MU-MIMO mode.

CDMA or OFDM is required to perform channel estimation to compensate for distortion of a signal due to a channel. Channel estimation methods may be classified into a pilot symbol aided channel estimation method of transmitting an appointed signal called a pilot and estimating a channel by using the pilot and a decision directed channel estimation method of estimating a channel by using both the pilot symbol and general data.

Further, in connection with this, technologies such as full dimensional MIMO or massive MIMO which uses many more input/output antennas based on LTE-A or the next generation communication standard. In this case, a communication method and system considering the accuracy of channel estimation and signal overhead according to transmission/reception of pilot signals is required. More specifically, when signals are transmitted or received through more antennas, transmission of more pilot signals is required to acquire the same channel estimation as the number of antennas increases. However, full dimensional MIMO or massive MIMO uses a larger number of antennas in comparison with previous MIMO. Accordingly, when the number of pilot signals increase, radio resources for transmission/reception of the pilot signals have overhead and transfer volume of the pilot signals may deteriorate.

The decision directed channel estimation method uses not only pilots, but also general data for the channel estimation, and uses determined data as if the data is the pilot based on an assumption that the decision is accurate. When a decision error is not generated, the decision directed channel estimation method may use larger amounts of information to acquire a better result compared to the pilot symbol aided channel estimation.

In contrast, when a large number of decision errors are generated, the conventional decision directed channel estimation method may directly use a hard decision value of the data channel. Accordingly, if an operation signal to noise ratio is low, the symbol of the data channel having the error rather acts as interference. Particularly, when a bit error rate is high, the decision directed channel estimation method may have the lower performance compared to the channel estimation method using only the pilot channel. Further, the conventional channel estimation method does not consider a communication method including eight or more transmission/reception antennas or suggests only estimating the channel through MIMO communication using the number of antennas used in the convention communication system.

SUMMARY

To address the above-discussed deficiencies, it is a primary object to provide an apparatus and method for detecting errors and re-estimating channels which re-estimate inaccurate channels estimated through an interpolation process by using decoded signals and acquire an improved log likelihood ratio to increase the decoding performance of a reception device through a turbo decoding unit during each iteration process for channel estimation. Another aspect of embodiments of the present disclosure is to use not only pilot signals, but also data for the channel estimation.

In accordance with an aspect of the present disclosure, a method for receiving a signal by a receiver in a mobile communication system is provided. The method includes: receiving a reference signal from a transmitter; determining first channel information based on the received reference signal; receiving a data signal based on the first channel information; and determining second channel information based on the received data signal and the first channel information.

In accordance with another aspect of the present disclosure, an apparatus of a mobile communication system is provided. The apparatus includes: at least one processor configured to receive a reference signal from the transmitter, to determine first channel information based on the received reference signal, to receive a data signal based on the first channel information, and to determine second channel information based on the received data signal and the first channel information.

According to embodiments of the present disclosure, it is possible to perform iterative channel estimation and reduce channel estimation errors by determining errors of signals received from a turbo decoding unit and using symbol information as pilots even in subcarriers where the pilot signals are not transmitted, and to increase the accuracy of LLR calculation through an iteration process such as a detection and decoding process in comparison with the conventional technology, thereby increasing the reception performance of the turbo decoding unit and improving communication efficiency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
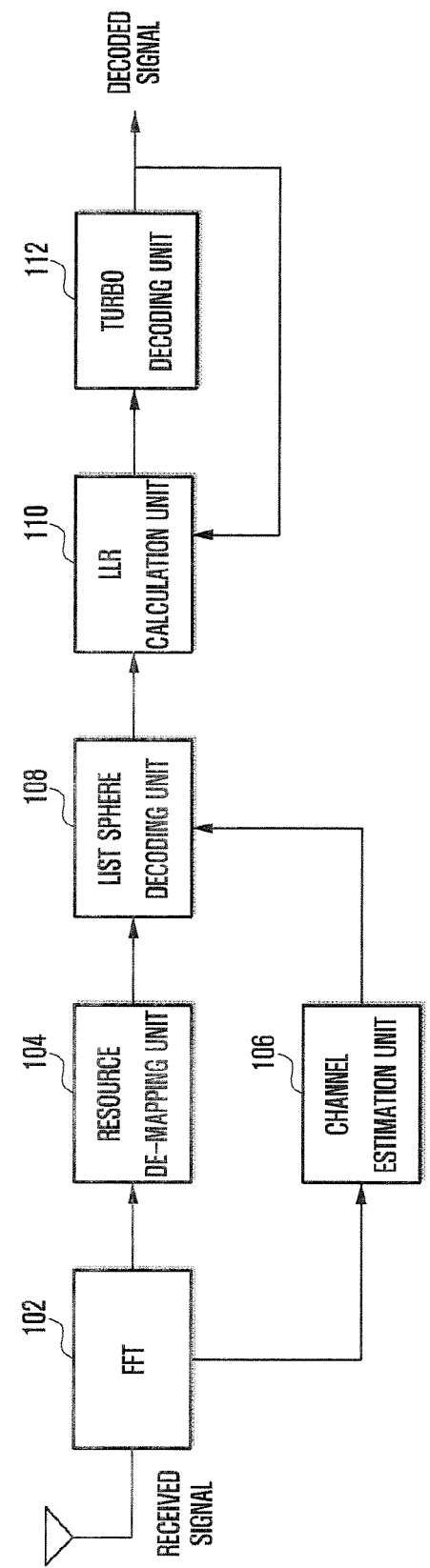
FIG. 1 is a block diagram of a receiver for performing an IDD scheme according to an embodiment of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, an embodiment of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions also can be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions also can be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations can represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" can be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" can be either combined into a smaller number of elements, "unit", or "module" or divided into a larger number of elements, "unit", or "module". Moreover, the elements and "units" or "modules" can be implemented to reproduce one or more CPUs within a device or a security multimedia card.

According to embodiments of the present disclosure, in every iterative process, a Multi-Input Multi-Output (MIMO) communication system to which an iterative detection and decoding scheme is applied converts a decoded signal into a symbol, determines whether the symbol has an error, re-estimate sa channel by using a signal which does not have an error, and detects and decodes the symbol based on the re-estimated channel, so as to perform more efficient communication.

In Long Term Evolution (LTE), which is the 4th generation mobile communication, a transmitting side transmits a pilot signal which is one of the Reference Signals (RSs) used to estimate a channel. Since transmitting and receiving sides know the configuration of the pilot signal, channel information of the pilot position can be estimated using an LS or MMSE estimation scheme. Channel estimation is required for all subcarriers, but no subcarriers are used for transmitting data when all subcarriers are used as pilot information. Accordingly, the transmitting side transmits the pilots at proper intervals and the receiving side performs the channel estimation for subcarriers corresponding to data transmission positions in which the pilot signals are not transmitted through an interpolation process. Further, since subcarrier through which the pilot is transmitted can estimate only one transmission antenna channel, the number of pilots is generally proportional to the number of antennas on the transmitting side.

When a Log Likelihood Ratio (LLR) is calculated again using a turbo-decoded signal in order to increase the performance of a wireless communication reception device, an IDD scheme using A Priori Probability (APP) is applied. In the IDD scheme, a turbo decoder's capability for reconstructing a received signal may increase as the number of iterations increases.

Since the pilot signal of the transmitting side is transmitted only for channel estimation, the channel corresponding to a position of the pilot signal of the transmitting side can be accurately estimated, but the channel estimated through the interpolation process is relatively inaccurate. Due to the inaccurate channel estimation, gains acquired through the Iterative Detection and Decoding (IDD) scheme are not large. Although various channel estimation schemes exist, the IDD scheme can be mainly applied to a Single-Input Single-Output (SISO) communication system. Application of the IDD scheme to a MIMO communication system cannot be made through a simple expansion and there are many matters to be considered.

The performance of the IDD scheme depends on the accuracy of the LLR calculated using a received signal and channel information. When inaccurate channel estimation information is used, the accuracy of the LLR becomes lower. Accordingly, if the inaccurate channel information is fixed, even though the number of iterations increases, it is hard to expect that the performance of the turbo decoder would increase. Particularly, when the IDD scheme is implemented in the next generation communication system after LTE, as the number of transmission antennas increases, an increase in the number of pilot signals will be required. However, at this time, a decrease in data transmission rate necessarily follows. Accordingly, in order to maintain the data transmission rate when the number of transmission antennas increases, an interval between the pilot signals should be wider. Therefore, when the number of transmission antennas increases, decrease in the channel estimation performance necessarily follows due to interpolation, and accordingly, the accuracy of the LLR is reduced and thus the performance through the IDD scheme cannot increase.

An iterative channel re-estimation and decoding apparatus according to an embodiment of the present disclosure includes a signal receiver that receives a signal transmitted from an external device, an error position estimator that estimates an error position from the received signal, and a channel estimator to re-estimate a MIMO channel by using the estimated error position and a decoded signal of a turbo decoder.

Further, a method of the iterative channel re-estimation and decoding apparatus according to an embodiment of the present disclosure includes a process of estimating an error position by using a received signal and a decoded signal of a turbo decoder and a process of re-estimating a MIMO channel in a data region by using information on the estimated error position.

In an embodiment, when a receiver cannot decode information transmitted from a transmitter can correspond to an error. The error has various causes and the causes may vary depending upon a channel state and a channel estimation value.

FIG. 1 is a block diagram of a receiver for performing the IDD scheme according to an embodiment of the present disclosure.

Referring to FIG. 1, the receiver according to the embodiment includes a Fast Fourier Transform (FFT) unit 102, a resource de-mapping unit 104, a channel estimation unit 106, a list sphere decoding unit 108, an LLR calculation unit 110, and a turbo decoding unit 112.

The FFT unit 112 performs FFT on a received signal to remove periodic cyclic prefix of OFDM.

The received original signal is passed through a channel estimation process by the channel estimation unit 106 and a resource de-mapping process by the resource de-mapping unit 104.

Further, based on the resource de-mapping and the channel estimation, the list sphere decoding unit 108 performs a decoding process. A configuration of the list sphere decoding unit 108 according to the embodiment can be optional. The list sphere decoding unit 108 according to the embodiment improves the reliability of the LLR by forming a list and performing a sphere decoding. Further, in the embodiment, the list sphere decoding unit 108 uses a Log Likelihood Ratio (LLR) value of the turbo decoding unit 112 as a priori information.

A result of the operation by the list sphere decoding unit 108 is received by the LLR calculation unit 110. In the embodiment, the LLR calculation unit 110 calculates the LLR based on the received signal. Further, in some embodiments, the LLR is calculated based on a result of the decoding by the turbo decoding unit 112 and the signal received from the list sphere decoding unit 108.

In addition, the turbo decoding unit 1120 performs a decoding process based on the signal received from the LLR calculation unit and outputs a result of the decoding.

In the embodiment, the received signal in the MIMO communication system is expressed as follows.

$$y = Hs + n$$

In the above equation, y denotes a received vector, H denotes a MIMO channel matrix, s denotes a symbol vector, and n denotes a Gaussian noise vector in the receiver. $s = f(x) = f([x_1, x_2, \ldots, x_{M_c}])$, $f(\cdot)$ denotes a modulation function according to each communication system configuration, and $x_i$ denotes a turbo-encoded bit. The receiver according to the embodiment determines a component corresponding to a channel received vector through the channel estimation and extract a symbol vector based on the received signal.

Figure 2:
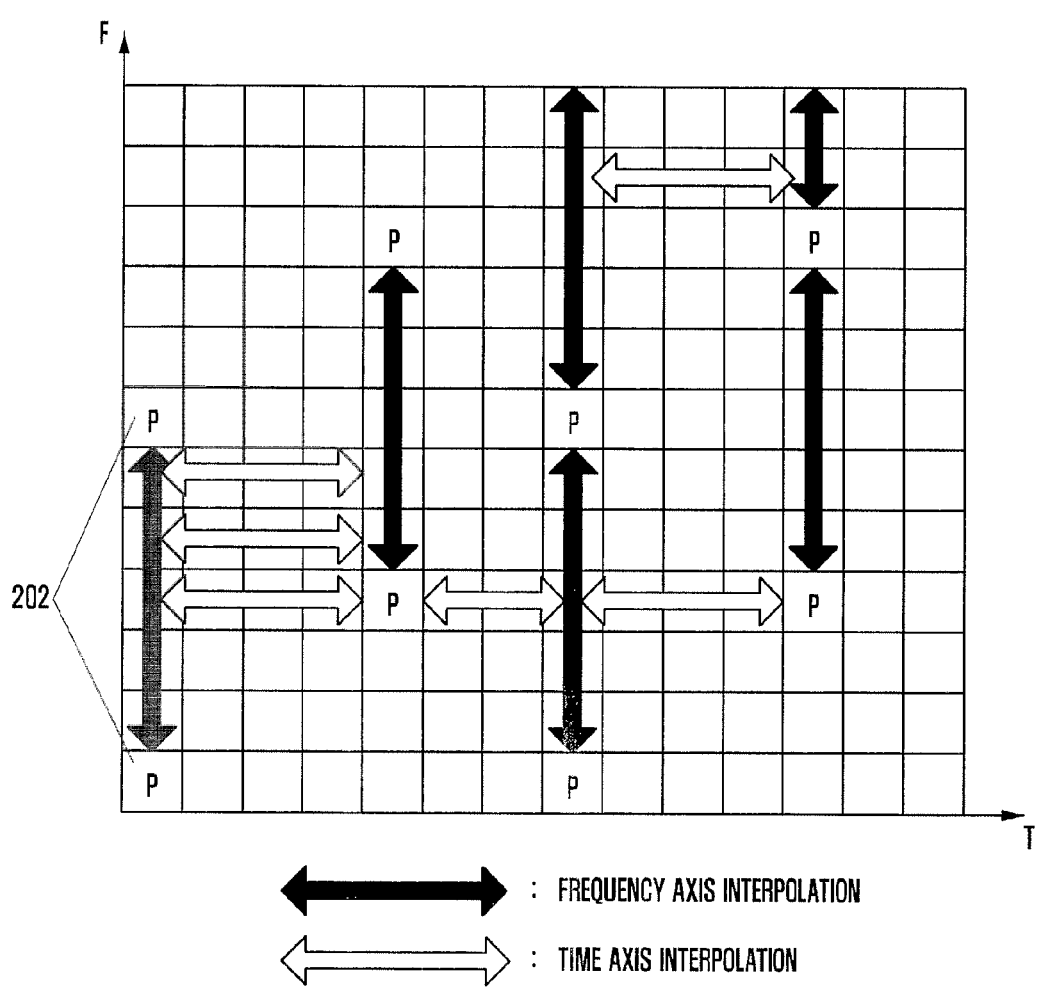
FIG. 2 illustrates a channel detection process in a wireless communication system according to an embodiment of the present disclosure.

FIG. 2 illustrates a channel detection process in a wireless communication system according to an embodiment of the present disclosure. More specifically, FIG. 2 shows an inherent grid structure and a channel estimation process in an LTE system.

Referring to FIG. 2, in the embodiment, pilot signals (P) are received in one or more resource regions through wireless channels.

In the MIMO system, the number of predetermined P positions increases according to the number of transmission antennas, and one predetermined antenna transmits the pilot signal in each pilot signal position to avoid interference between transmission antennas. A pilot signal received from a predetermined ith transmission antenna in the pilot signal position can be expressed as follows.

$$\begin{bmatrix} y_1 \\ y_2 \\ \vdots \\ y_{M-1} \\ y_M \end{bmatrix} = \begin{bmatrix} h_{1,1} & h_{1,2} & \ldots & h_{1,M-1} & h_{1,M} \\ h_{2,1} & h_{2,2} & \ldots & h_{2,M-1} & h_{2,M} \\ \vdots & \vdots & \ddots & \vdots & \vdots \\ h_{M-1,1} & h_{M-1,2} & \ldots & h_{M-1,M-1} & h_{M-1,M} \\ h_{M,1} & h_{M,2} & \ldots & h_{M,M-1} & h_{M,M} \end{bmatrix} \begin{bmatrix} 0 \\ \vdots \\ p_i \\ \vdots \\ 0 \end{bmatrix} + \begin{bmatrix} n_1 \\ n_2 \\ \vdots \\ n_{M-1} \\ n_M \end{bmatrix} \quad (1)$$

In the above equation, $h_{ij}$ denotes a component in an i, j position of an M×M complex MIMO channel H. The term $p_i$ denotes a pilot signal transmitted from an ith transmission antenna and denotes a noise component received by a jth reception antenna. Based on the above equation, a channel between the ith transmission antenna and the jth reception antenna can be estimated as follows.

$$\hat{h}_{i,j} = \frac{p_i^* y_j}{p_i^* p_i} \quad (2)$$

Channel information acquired through such a process can be used for an interpolation process on a frequency axis and a time axis of the OFDM system where the pilot signal is located, and the channel of the region where data between pilots is transmitted can be estimated through the interpolation process. Accordingly, as the number of pilots increases, the accuracy of the estimated data region channels becomes higher, but the number of data regions decreases. Therefore, a data transmission rate is reduced. Further, as the number of transmission antennas increases, the number of pilot regions increases. However, in order to maintain the data transmission rate, the interval between the pilots should increase. Accordingly, the interval between the channels of the data region to be estimated through the interpolation process gradually increases. Then, as the number of transmission antennas increases, the accuracy of the estimated channels gradually decreases.

The estimated channel information and the received signals are transmitted to the list sphere decoding unit 108 and included in a symbol list in which the LLR is calculated. The reason for the process is to acquire a result similar to a result generated when all symbol cases calculated by the LLR calculation unit 110 are considered while avoiding high complexity generated when the LLR calculation unit 110 calculates all symbol cases. The detected symbol list is transmitted to the LLR calculation unit 110 and the LLR is calculated as follows.

$$L_D(x_k \mid y) = \ln \frac{P(x_{k+} \mid y)}{P(x_{k-} \mid y)} \quad (3)$$

$x_{k+}$ and $x_{k-}$ denote cases where a $k^{th}$ bit of a bit sequence x of s are +1 and −1, respectively. When it is assumed that $x_k$ is independent and identical distribution (i.i.d.), the LLR calculation equation is expressed as follows.

$$L_D(x_k \mid y) = \ln \frac{P(x_{k+})}{P(x_{k-})} + \ln \frac{\sum_{x_{k+}} P(y \mid x_{k+}) P(x_{\bar{k}})}{\sum_{x_{k-}} P(y \mid x_{k-}) P(x_{\bar{k}})}$$

In the above equation, $x_{\bar{k}} = [x_1, x_2, \ldots, x_{K-1}, x_{K+1}, \ldots x_{M_c}]$ is established, and $P(x_k)$ denotes a Probability Mass Function (PMF) of each bit. Further, in the above equation, a first term is a preferential component of the LLR and a second term is an external component. In general, the preferential component is referred to as $L_A$ and the external component is referred to as $L_E$. In the beginning where the preferential component is not given, $$P(x_{k+}) = P(x_{k+}) = \frac{1}{2}$$

is assumed, so that $L_A = 0$. However, when the number of iterations increases and an a priori probability is given by the turbo decoding unit, $L_A \neq 0$.

Meanwhile, in the above equation, $P(y \mid x_k)$ can be expressed as follows on an assumption of Gaussian noise.

$$P(y \mid x_k) = \frac{1}{\sqrt{2\pi\sigma^2}} \exp\left(-\frac{\|y - Hs_{x_k}\|^2}{2\sigma^2}\right) \quad (4)$$

In the above equation, $S_{x_k}$ denotes a symbol modulated from a sequence having an $k^{th}$ bit of $x_k$. Accordingly, the external component $L_E$ can be calculated as follows.

$$L_E = \ln \frac{\sum_{x_{k+}} \frac{1}{\sqrt{2\pi\sigma^2}} \exp\left(-\frac{\|y - Hs_{x_{k+}}\|^2}{2\sigma^2} + \frac{1}{2} X_{\bar{k}}^T L_{A,\bar{k}}\right)}{\sum_{x_{k-}} \frac{1}{\sqrt{2\pi\sigma^2}} \exp\left(-\frac{\|y - Hs_{x_{k-}}\|^2}{2\sigma^2} + \frac{1}{2} X_{\bar{k}}^T L_{A,\bar{k}}\right)} \quad (5)$$

In the above equation, $L_{A,\bar{k}}$ denotes a sequence of the preferential LLR expect for a $k^{th}$ LLR. The LLR is transmitted to the turbo decoding unit 112, and an output of the turbo decoding unit 122 can be used for calculating the LLR as the preferential component $L_A$ in the next iteration process.

As a result, in the IDD, the external component $L_E$ is calculated by the received signal y, the channel information H, and $L_A$ acquired from the output of the turbo decoding unit 112. When the estimation of the channel information H is not performed correctly, it results in generating the inaccurate external component $L_E$ and also the inaccurate $L_A$ acquired from the turbo decoding unit 112 in the next iteration process. Accordingly, even when the number of iterations increases, the performance increase may be slow. Therefore, the accuracy of the channel information H is an important factor influencing the overall performance of the IDD.

Figure 3:
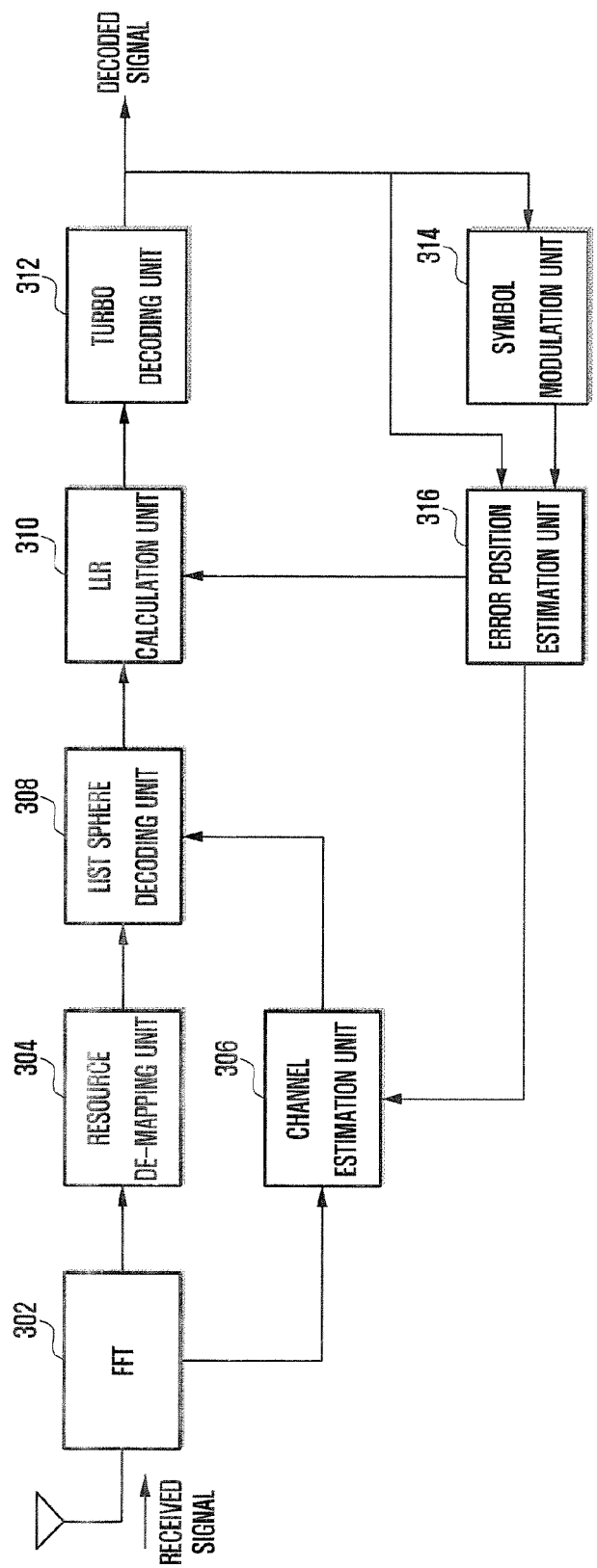
FIG. 3 is a block diagram of an iterative channel re-estimation and decoding apparatus according to an embodiment of the present disclosure.

FIG. 3 is a block diagram of an iteration channel re-estimation and decoding apparatus according to an embodiment of the present disclosure.

Referring to FIG. 3, the apparatus of FIG. 3 includes components similar to those of the apparatus of FIG. 1, but further includes a symbol modulation unit 314 and an error position estimation unit 316. Further, the apparatus according to the embodiment further performs a process of detecting an error position by using a turbo-decoded signal acquired from the previous iteration process, a process of performing iterative channel estimation on a data region by using a symbol that does not have a detected error, and a process of calculating again an LSD and LLR by using the channel.

In the embodiment, the symbol for channel re-estimation is obtained by re-modulating the turbo-decoded signal $L_A$ through the symbol modulation unit 314.

$$\hat{s} = f(L_A) = f([L_{A,1}, L_{A,2}, \ldots, L_{A,M_c}]) \quad (6)$$

Based on the above equation, $f(\cdot)$ uses the same modulation function as that on the transmitting side. Since the symbol estimated through the above process may include the error from the turbo decoding unit, determining the part having the error and selecting only a correct symbol through the error position estimation unit 316 is required.

A method of estimating an error position according to an embodiment uses at least one of a sparse recovery algorithm based on the fact that the error position is similar to a characteristic of a sparse signal and a method using thresholding based on the fact that average power of the error is larger than power of the transmitted symbol.

In the embodiment, the sparse recovery algorithm increases in complexity as the number of antennas increases and the method using thresholding has different performances depending on a threshold value.

The error position estimation unit 316 performs the following process. A determination equation is calculated from the received signal by using the channel information $\hat{H}$ acquired through the iteration process.

$$z = \hat{H}^{30}(y - \hat{H}\hat{s}) = \hat{H}^*(Hs - \hat{H}\hat{s} + n) \quad (7)$$

In the above equation, $\hat{H}^+=(H^H H)^{-1}H^H$. When an error difference between an estimated symbol $\hat{s}$ and an actually transmitted symbol s, $\hat{s}=s+e$. Accordingly, the determination equation z is expressed as follows.

$$z = \hat{H}^+ Hs - \hat{H}^+ \hat{H}(s+e) + \hat{H}^+ n \qquad (8)$$
$$= -e + (\hat{H}^+ H - I)s + \hat{H}^+ n$$

In the above equation, I corresponds to a unit matrix. When the estimated symbol is the same as the actually transmitted symbol, e=0. When the estimated symbol is not the same as the actually transmitted symbol, e corresponds to a difference between the symbols, so that e is larger than power of the actually transmitted symbol. Since $(\hat{H}^+H-I)$ is based upon a channel estimation error, $(\hat{H}^+H-I)$ is smaller than power of the channel H. Accordingly, the error position can be estimated by finding error power lager than a threshold value $\delta_{Th}$ as follows.

$$I_{\hat{e}} = \begin{cases} 1 & \|z\|^2 > \delta_{Th} \\ 0 & \text{otherwize} \end{cases} \qquad (9)$$

In the above equation, $I_{\hat{e}}$ denotes an index indicating an error position. The 1 indicates that an estimated symbol of a current position is different from a transmitted symbol, and the 0 indicates that there is no error in the current position.

In the embodiment, the following two incorrect error determinations are generated in such a process.

First, even though an error is not actually generated, a false alarm is made in which the generation of the error is determined due to a relatively large channel estimation error in the above equation.

Second, misdetection is made in which it is determined that there is no error since error power is smaller than the threshold value $\delta_{Th}$.

Since the former between the two wrong error determinations does not use a correct symbol vector and a channel of the position is interpolated by the channel estimation using another correct symbol vector, the performance deterioration is not made. Since the latter performs the channel estimation by using an incorrect symbol vector, a channel estimation error becomes larger and another region is influenced in the interpolation process, so that the performance deterioration in the iteration process is made. Accordingly, when the threshold value $\delta_{Th}$ is set, it is better to relatively reduce the misdetection than the false alarm. In the embodiment, the threshold value $\delta_{Th}$ can be a value stored in the receiver or a value received from a base station.

The estimated error position information is transmitted to each of the LLR calculation unit 310 and the channel estimation unit 306.

The LLR calculation unit 310 determines the accuracy of a priori information transmitted from the turbo decoding unit 312 by using the estimated error position. A priori information of the position where it is determined that the error does not exist can be used as the preferential component $L_A$ in the calculation by the LLE calculation unit 310. However, a priori information of the position where it is determined that the error exists may not be used and the LLR is calculated in a state ($L_A$=0) where a priori information is not given like the first iteration process of the IDD scheme.

The channel estimation unit 306 performs a channel re-estimation process by using the received error position and symbol information. Further, a result of the channel re-estimation can be transmitted to the list sphere decoding unit 308.

In the receiver according to the embodiment, reception of a signal is performed by a signal receiver.

Further, a controller that controls the signal receiver and elements included in the receiver can be included.

Figure 4:
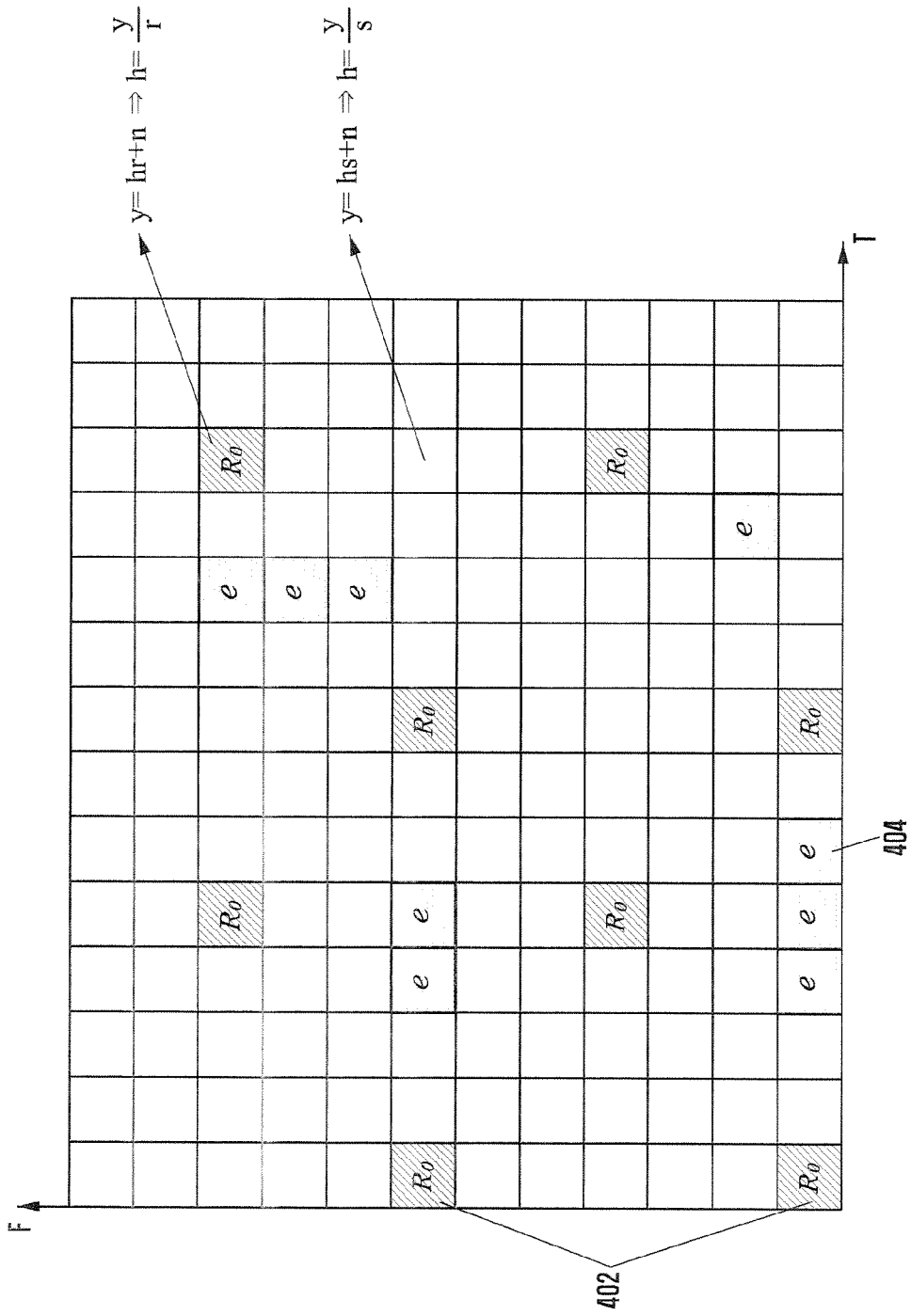
FIG. 4 illustrates a channel re-estimation process in a SISO system according to an embodiment of the present disclosure.

FIG. 4 illustrates a channel re-estimation process in a SISO system according to an embodiment of the present disclosure. More specifically, a channel re-estimation process in a SISO communication system will be described.

Referring to FIG. 4, the embodiment illustrates resource regions in which reference signals (R0) 402 are received and resource regions (e) 404 located at error positions transmitted from the error position estimation unit.

In this case, since the structure of the pilot region and the structure of the data region are the same as each other in that signals are transmitted from one antenna, the re-estimation can be performed using the data symbol.

$$\tilde{h}_{i,j} = \frac{\hat{s}_i^* y_j}{\hat{s}_i^* \hat{s}_i} \qquad (10)$$

The re-estimated channel reduces intervals to be interpolated and increases the number of samples for the interpolation compared to the case using the pilots, so that various types of interpolation processes as well as a simple linear interpolation method can be used. Accordingly, the inaccurate channel due to the interpolation process acquired through the previous iteration process is corrected. As a result, a more accurate LLR can be calculated in the current iteration process.

When the method according to the embodiment is applied to the MIMO communication system, the difference from the case where the method is applied to the SISO communication system is generated. In the pilot region, the signal is transmitted from one antenna in both the MIMO environment and the SISO environment, and thus the channel estimation can be performed without interference by other antennas. However, while the SISO environment includes the data region having the same structure as that of the pilot region in which data is transmitted from one antenna, signals are transmitted from all antennas on the transmitting side and all pieces of data from all transmission antennas are combined and received by each antenna on the receiving side in the MIMO environment. As a result, in the MIMO environment, interference between antennas is generated. Accordingly, it may be difficult to simply apply the method used in the SISO environment to the MIMO environment.

In this case, even though the transmitted symbol $\hat{s}$ is accurately recognized, the channel estimation cannot be performed by one data symbol vector alone because of the large number of channels H to be estimated. The most easily performed method includes a method of estimating channels of each antenna by removing signals of each transmission antenna through the use of channel estimation information acquired during the previous iteration process and a method of simultaneously estimating a plurality of regions at one time through the use of adjacent regions having relatively small changes while ignoring a change in the channels.

The method of removing interference to estimate channels has advantages in that all channels can be simply estimated by one data symbol vector alone. However, when the number of transmission antennas is large, if signals of other transmission antennas are not completely removed using inaccurate channel information acquired during the previous iteration process, error propagation may be generated.

The method of using adjacent regions to estimate channels is effective in a case where a rate of channel change is relatively slow. However, if the channels rapidly change, the estimated channels may be relatively inaccurate.

Figure 5:
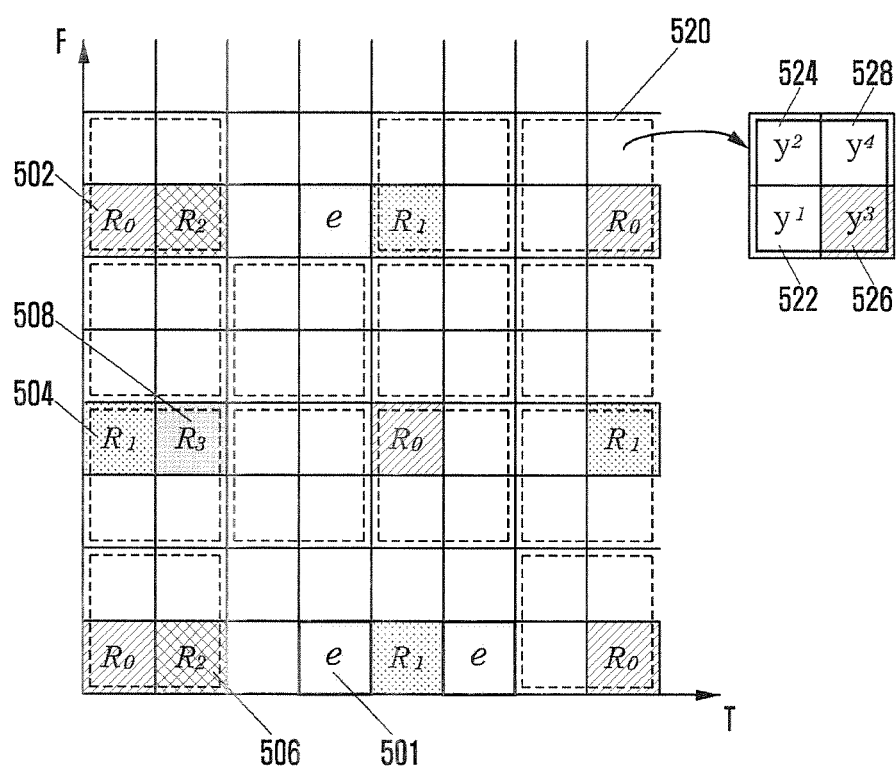
FIG. 5 illustrates a channel re-estimation process in a MIMO system according to an embodiment of the present disclosure.

FIG. 5 illustrates a channel re-estimation process in a MIMO system according to an embodiment of the present disclosure. More specifically, FIG. 5 shows a channel re-estimation process from each transmission antenna to a first reception antenna in the MIMO communication system.

Referring to FIG. 5, left grids partially indicate a structure between time and frequency corresponding to subframes on the transmitting side. The term $R_0$ 502 denotes a pilot signal allocated to a first transmission antenna, $R_1$ 504, $R_2$ 506, and $R_3$ 508 denote pilot signals allocated to a second, third, and fourth transmission antennas, respectively. Further, e 501 indicates an error position transmitted from the error position estimation unit.

In the embodiment, signals of the remaining other antennas except for the antennas transmitting the pilot signal are not transmitted in positions where the pilots are located. For example, only a pilot symbol of the first antenna is located at a symbol position to which $R_0$ 502 is allocated, and pilot symbols or data symbols of other antennas are not located at the symbol position. Data symbols of all transmission antennas are located at the remaining positions to which the pilots are not allocated. The receiving side receives only pilot signals in the positions corresponding to the pilots and receives combined pieces of data transmitted from all transmission antennas in data positions.

The suggested method can estimate data symbols and detect errors, and then re-estimate channels by using the part except for e 501 determined to be the errors. Since only the pilot symbols are transmitted in the pilot positions but data symbols of transmission antennas coexist in the data positions (four data symbols are transmitted in a 4×4 structure), it is difficult to estimate each channel. Accordingly, channels of the data positions are estimated using adjacent channels based on the characteristic of the OFDM system where the adjacent channels are slightly changed.

In the embodiment, received signals for a resource region 520 includes four adjacent grid received signals $y^1$ 522, $y^2$ 524, $y^3$ 526, and $y^4$ 528 in a 4×4 structure.

$$y_2^1 = h_{21}^1 s_1^1 + h_{22}^1 s_2^1 + h_{23}^1 s_3^1 + h_{24}^1 s_4^1 + n_2^1 \quad (11)$$

$$y_3^1 = h_{31}^1 s_1^1 + h_{32}^1 s_2^1 + h_{33}^1 s_3^1 + h_{34}^1 s_4^1 + n_3^1 \quad (12)$$

$$y_4^1 = h_{41}^1 s_1^1 + h_{42}^1 s_2^1 + h_{43}^1 s_3^1 + h_{44}^1 s_4^1 + n_4^1 \quad (13)$$

$$y_1^2 = h_{11}^2 s_1^2 + h_{12}^2 s_2^2 + h_{13}^2 s_3^2 + h_{14}^2 s_4^2 + n_1^2 \quad (14)$$

$$y_2^2 = h_{21}^2 s_1^2 + h_{22}^2 s_2^2 + h_{23}^2 s_3^2 + h_{24}^2 s_4^2 + n_2^2 \quad (15)$$

$$y_3^2 = h_{31}^2 s_1^2 + h_{32}^2 s_2^2 + h_{33}^2 s_3^2 + h_{34}^2 s_4^2 + n_3^2 \quad (16)$$

$$y_4^2 = h_{41}^2 s_1^2 + h_{42}^2 s_2^2 + h_{43}^2 s_3^2 + h_{44}^2 s_4^2 + n_4^2 \quad (17)$$

$$y_1^3 = h_{11}^3 p_1^3 + n_1^3 \quad (18)$$

$$y_2^3 = h_{21}^3 p_1^3 + n_2^3 \quad (19)$$

$$y_3^3 = h_{31}^3 p_1^3 + n_3^3 \quad (20)$$

$$y_4^3 = h_{41}^3 p_1^3 + n_4^3 \quad (21)$$

$$y_2^4 = h_{21}^4 s_1^4 + h_{22}^4 s_2^4 + h_{23}^4 s_3^4 + h_{24}^4 s_4^4 + n_2^4 \quad (22)$$

$$y_3^4 = h_{31}^4 s_1^4 + h_{32}^4 s_2^4 + h_{33}^4 s_3^4 + h_{34}^4 s_4^4 + n_3^4 \quad (23)$$

$$y_4^4 = h_{41}^4 s_1^4 + h_{42}^4 s_2^4 + h_{43}^4 s_3^4 + h_{44}^4 s_4^4 + n_4^4 \quad (24)$$

In the embodiment, it is assumed that an antenna of the third region 526 receives only the pilot signal. When it is assumed that channels $h_{11}^i$, $h_{12}^i$, $h_{13}^i$, and $h_{14}^i$ (i=1, 2, 3, 4), of the reception antenna are consistent regardless of i in adjacent grids, it may be expressed by a vector and a matrix.

$$\begin{bmatrix} y_1^1 \\ y_1^2 \\ y_1^3 \\ y_1^4 \end{bmatrix} = \begin{bmatrix} s_1^1 & s_2^1 & s_3^1 & s_4^1 \\ s_1^2 & s_2^2 & s_3^2 & s_4^2 \\ p_1^3 & 0 & 0 & 0 \\ s_1^4 & s_2^4 & s_3^4 & s_4^4 \end{bmatrix} \begin{bmatrix} h_{11} \\ h_{12} \\ h_{13} \\ h_{14} \end{bmatrix} + \begin{bmatrix} n_1^1 \\ n_1^2 \\ n_1^3 \\ n_1^4 \end{bmatrix} \quad (25)$$

Through the above relationship, the channels $h_{11}^i$, $h_{12}^i$, $h_{13}^i$, and $h_{14}^i$ of the data positions can be estimated as follows.

$$\begin{bmatrix} \tilde{h}_{11} \\ \tilde{h}_{12} \\ \tilde{h}_{13} \\ \tilde{h}_{14} \end{bmatrix} = \begin{bmatrix} s_1^1 & s_2^1 & s_3^1 & s_4^1 \\ s_1^2 & s_2^2 & s_3^2 & s_4^2 \\ p_1^3 & 0 & 0 & 0 \\ s_1^4 & s_2^4 & s_3^4 & s_4^4 \end{bmatrix}^{-1} \begin{bmatrix} y_1^1 \\ y_1^2 \\ y_1^3 \\ y_1^4 \end{bmatrix} \quad (26)$$

In other reception antennas, data region channels can be re-estimated in the same way. However, a matrix including estimated symbols should have an inverse matrix. When the inverse matrix cannot be acquired due to rank deficiency of the matrix including the estimated symbols, other adjacent regions are selected and the channels are re-estimated. Through such a process, the data interpolation interval can be reduced and the accuracy of the LLR calculation can be increased in the channel estimation during the next iteration process like in the SISO system.

Figure 6:
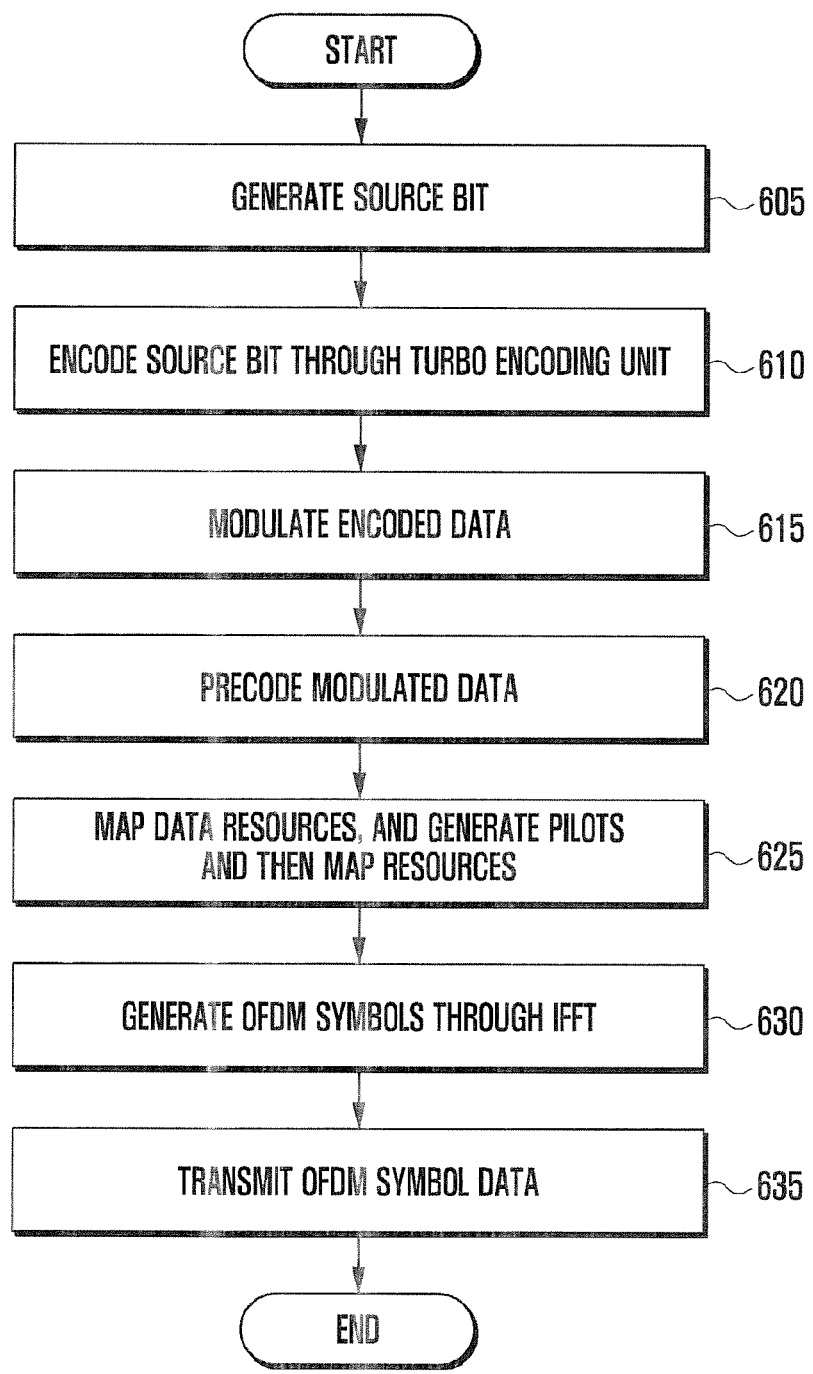
FIG. 6 is a flowchart illustrating an operation of a transmitter according to embodiment of the present disclosure.

FIG. 6 is a flowchart illustrating an operation of a transmitter according to embodiment of the present disclosure.

Referring to FIG. 6, the transmitter according to the embodiment generates a source bit to be transmitted to the receiver in step 605.

In step 610, the transmitter encodes the generated source bit. In the embodiment, the transmitter encodes the source bit through a turbo encoding unit.

In step 615, the transmitter modulates the encoded data. Modulation schemes can vary depending on embodiments and different modulation methods can be applied based on a channel state reported by the receiver.

In step 620, the transmitter precodes the modulated data. The precoding can be also performed based on the channel state. The precoding method can be shared in advance between the transmitter and the receiver and can be variably performed according to a condition.

In step 625, the transmitter performs at least one of an operation of mapping data resources and an operation of generating pilot signals and then mapping the generated pilot signals to corresponding radio resources.

In step 630, the transmitter generates OFDM symbols through Inverse Fast Fourier Transform (IFFT) based on the mapped resource region.

In step 635, the transmitter transmits data including generated symbols to the receiver.

Figure 7:
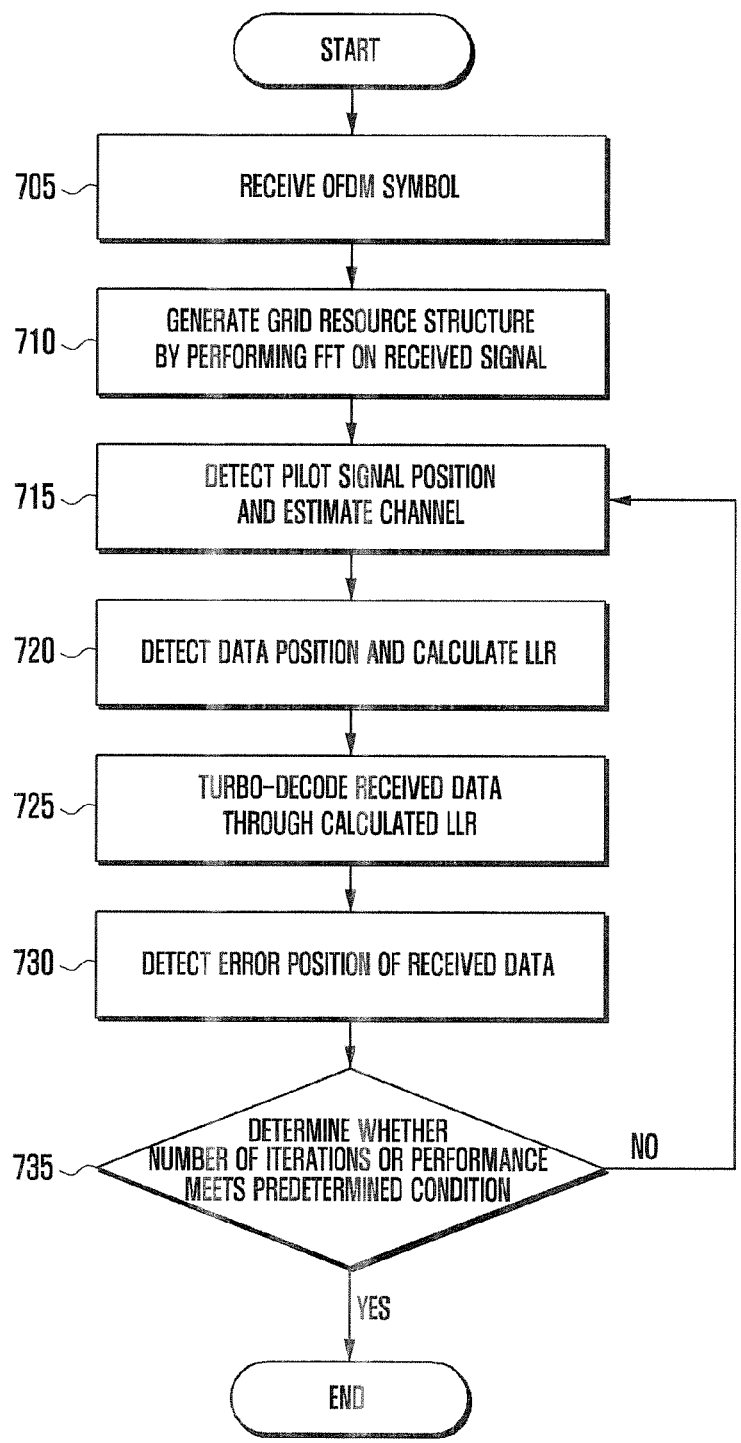
FIG. 7 is a flowchart illustrating an operation of a receiver according to embodiment of the present disclosure.

FIG. 7 is a flowchart illustrating an operation of a receiver according to embodiment of the present disclosure.

Referring to FIG. 7, the receiver according to the embodiment receives signals including OFDM symbols from the transmitter in step 705.

In step 710, the receiver generates a grid resource structure by performing FFT on the received signals In step 715, the receiver detects positions of pilot signals and estimate channels based on the detected positions. According to an embodiment, the positions of the pilot signals are determined according to a pre-arranged method between the transmitter and the receiver. According to another embodiment, the positions of the pilot signals are determined by the receiver based on information included in the received signals.

In step 720, the receiver detects data positions from the received signals and calculates an LLR. In some embodiments, the LLR calculation is performed based on the received signals and the estimated channel information.

In step 725, the receiver decodes the received signals based on the calculated LLR. According the embodiment, the receiver decodes the received signals by using a turbo decoding unit.

In step 730, the receiver detects an error position based on at least one of the decoded signal and a signal which is symbol-modulated from the decoded signal. A method of estimating an error position according to an embodiment uses at least one of a sparse recovery algorithm based on the fact that the error position is similar to a characteristic of a sparse signal and a method using thresholding based on the fact that average power of the error is larger than power of the transmitted symbol. Further, in the embodiment, the threshold value for determining the error is preset by the receiver or determined by the receiver based on the signals received from the transmitter. Based on the detected error position, the receiver performs at least one of the channel estimation and the LLR calculation, and accordingly receives signals with higher reliability.

The receiver determines whether the number of iterations or the reception performance meets a predetermined condition in step 735. When the condition is met, the process ends. Otherwise, steps 715 to 730 are repeatedly performed through the iteration until the condition is met.

Figure 8:
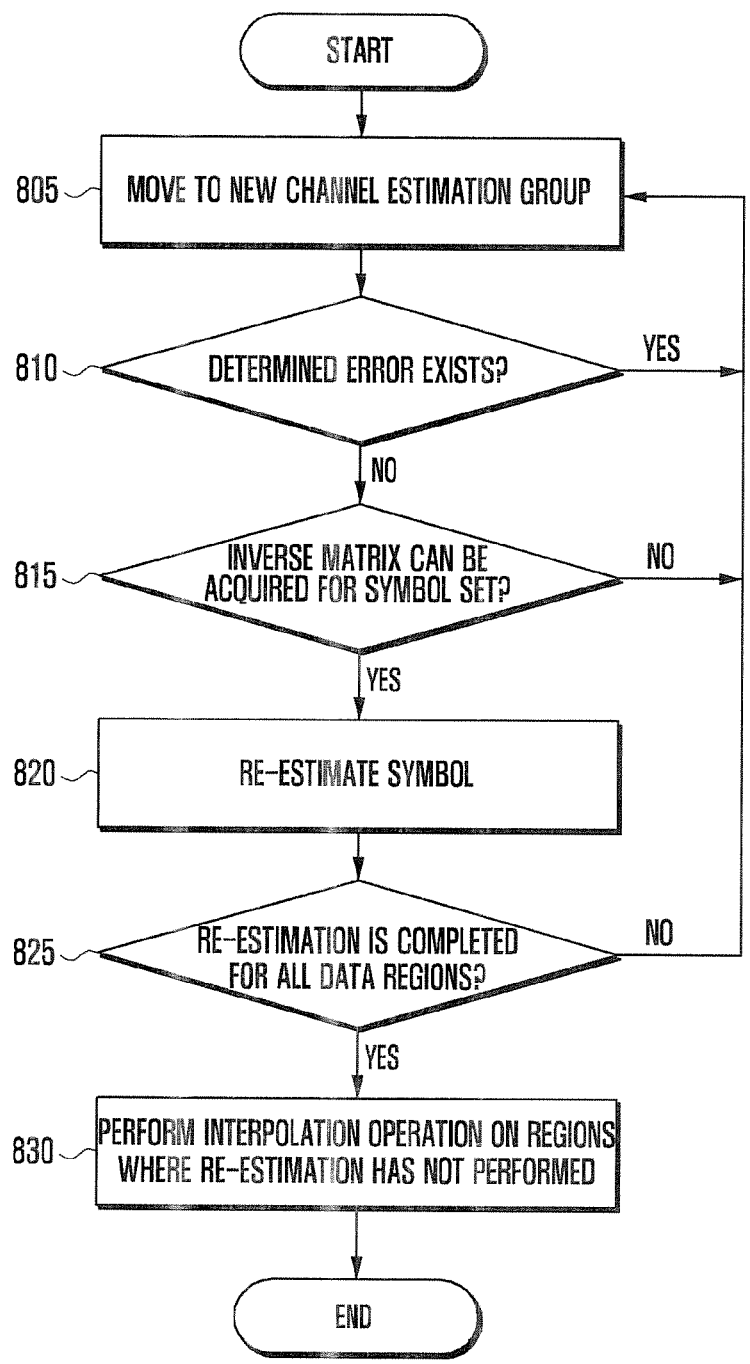
FIG. 8 is a flowchart illustrating a channel estimation process according to embodiment of the present disclosure.

FIG. 8 is a flowchart illustrating a channel estimation process according to embodiment of the present disclosure.

Referring to FIG. 8, the receiver selects a radio resource group for the channel estimation in step 805. The radio resource can be selected based on at least one of an antenna position and a position where a reference signal is transmitted.

In step 810, the receiver determines whether there is a determined error in the selected radio resource group. In the embodiment, the error position estimation unit included in the receiver determines whether the signal transmitted to the radio resource region has no error. When the signal has the determined error, the receiver selects a new radio resource group without the channel estimation in the corresponding resource region. Further, according to the embodiment, when the signal has the determined error, a channel value estimated in the corresponding resource region may have low importance.

In step 815, it is determined whether an inverse matrix for estimating channels of a symbol set can be calculated.

When the inverse matrix cannot be calculated, the receiver moves to step 805 and select a new resource region without the channel estimation in the corresponding region.

When the inverse matrix can be calculated, the receiver re-estimates symbols in step 820. The symbol re-estimation is performed on symbols extracted from the received signals based on the channel information estimated according to the inverse matrix.

In step 825, the receiver determines whether the symbol re-estimation is completed in all data regions in which the symbol re-estimation is performed among the received signals. When the symbol-re-estimation is not completed, the receiver repeats the process until the symbol re-estimation is completed.

In step 830, the receiver estimates channels in all received signal regions by performing an interpolation operation on regions in which the re-estimation has not been performed due to the error.

Figure 9:
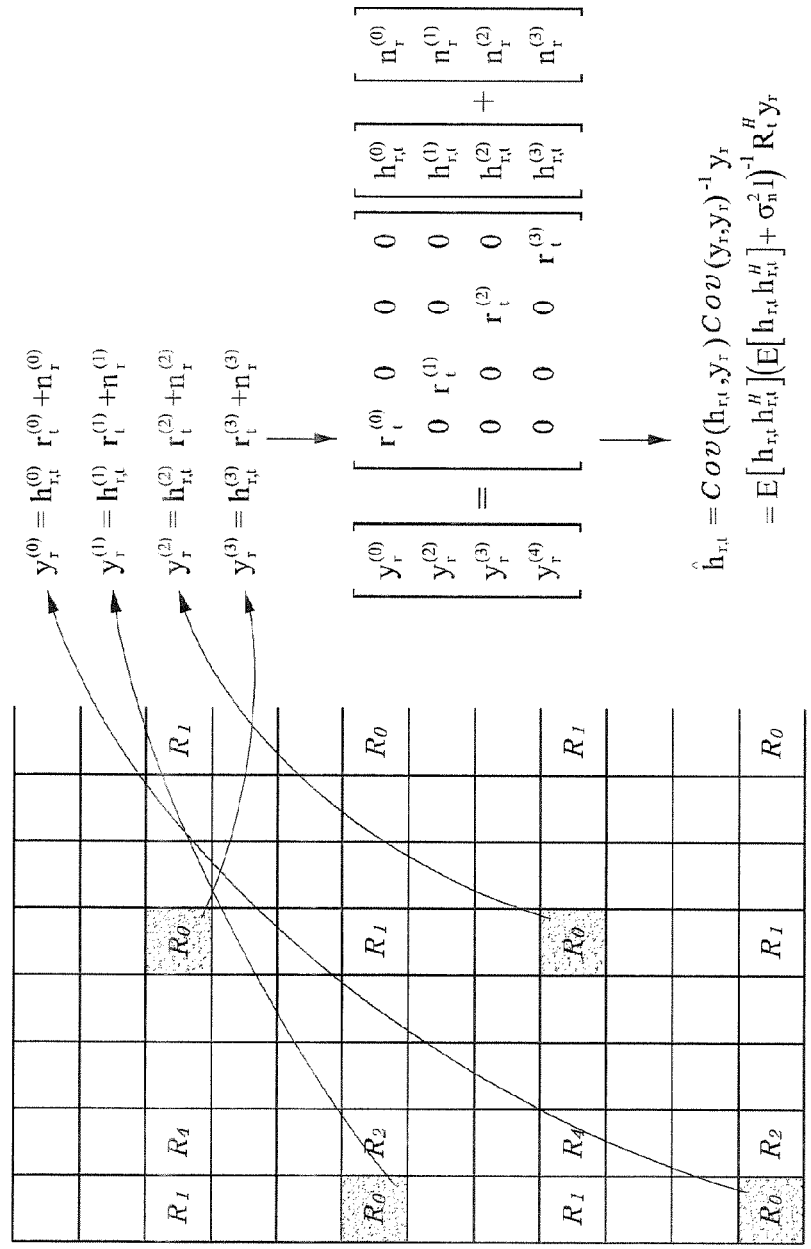
FIG. 9 illustrates an MMSE estimation process in a case of vectorization according to an embodiment of the present disclosure.
Figure 10:
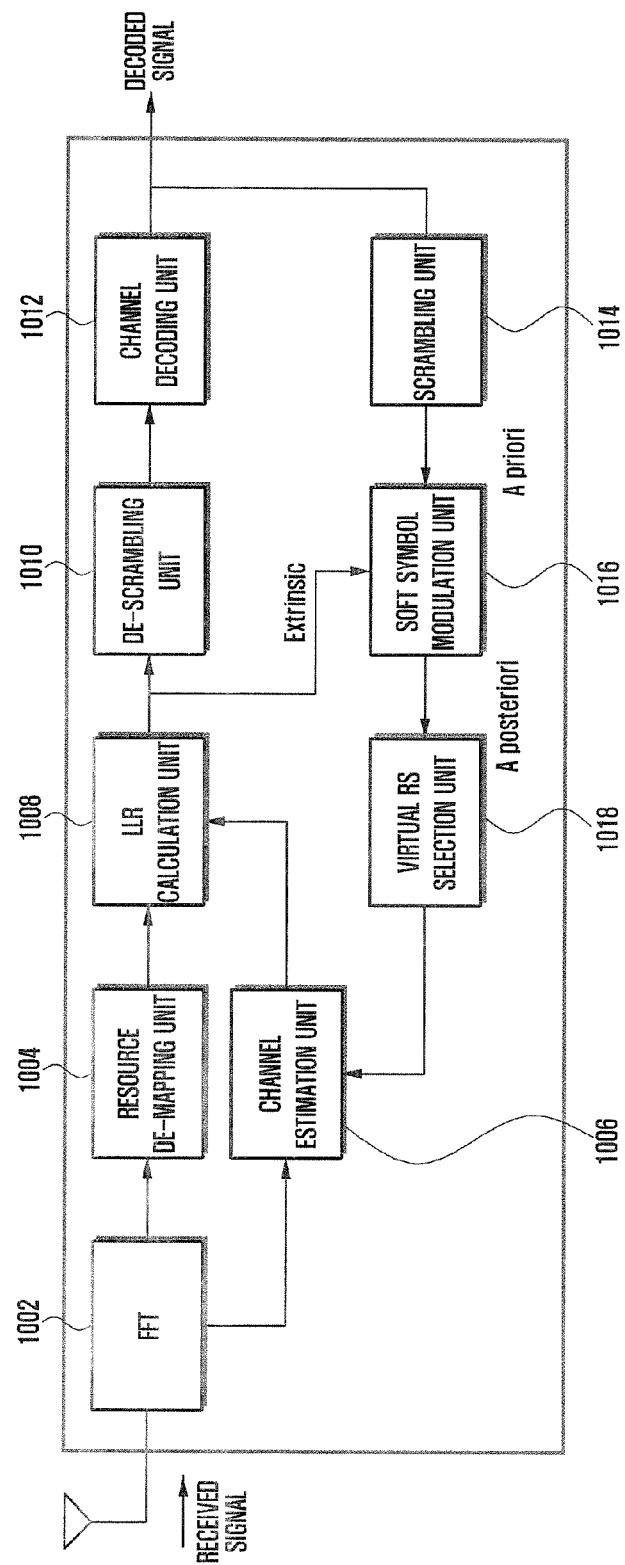
FIG. 10 is a block diagram of an iterative channel re-estimation and decoding apparatus according to another embodiment of the present disclosure.
Figure 11:
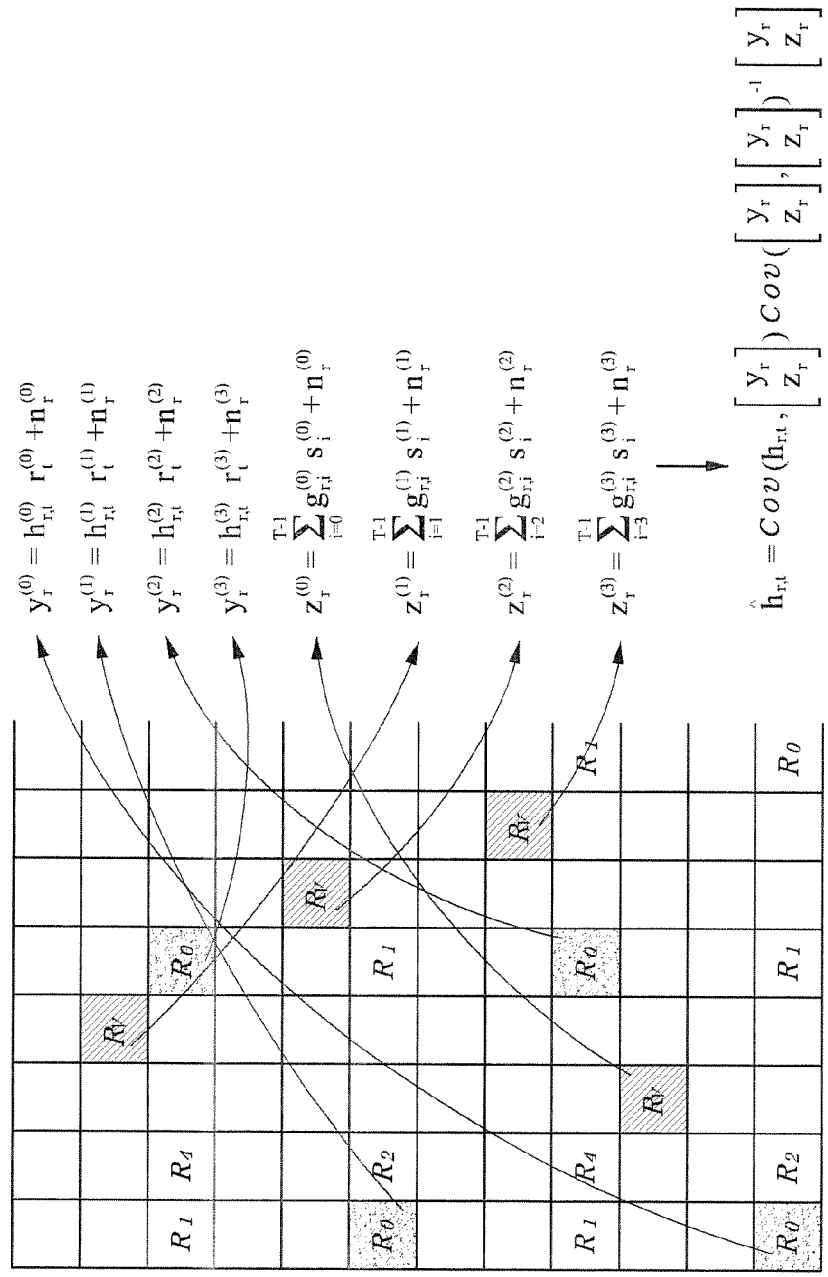
FIG. 11 illustrates a channel re-estimation process using a virtual RS according to an embodiment of the present disclosure.
Figure 12:
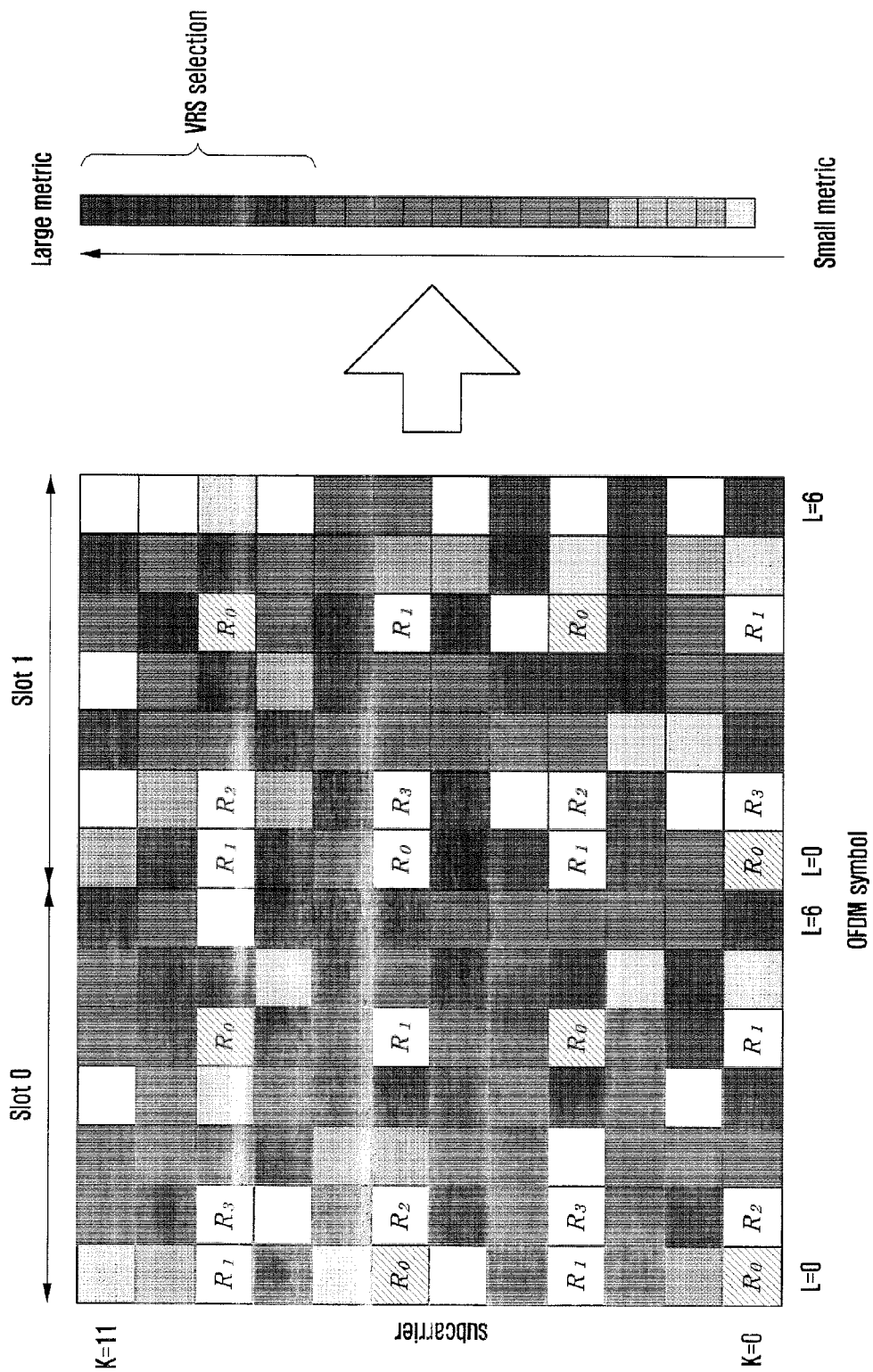
FIG. 12 illustrates a virtual RS selection process according to an embodiment of the present disclosure.

FIG. 9 illustrates an MMSE estimation process in vectorization according to an embodiment of the present disclosure, FIG. 10 is a block diagram of an iterative channel re-estimation and decoding apparatus according to another embodiment of the present disclosure, FIG. 11 illustrates a channel re-estimation process using a virtual Reference Signal (RS) according to an embodiment of the present disclosure, and FIG. 12 illustrates a virtual RS selection process according to an embodiment of the present disclosure.

Referring to FIGS. 9 to 12, pieces of information received at pilot positions in one resource block are arranged and vectorized.

$$y_r^{(0)} = h_{r,t}^{(0)} r_t^{(0)} + n_r^{(0)}$$

$$y_r^{(1)} = h_{r,t}^{(1)} r_t^{(1)} + n_r^{(1)}$$

$$y_r^{(2)} = h_{r,t}^{(2)} r_t^{(2)} + n_r^{(2)}$$

$$y_r^{(3)} = h_{r,t}^{(3)} r_t^{(3)} + n_r^{(3)} \quad (27)$$

In the above equation, $y_r^{(i)}$ denotes a received signal of an $i^{th}$ pilot position transmitted to an $r^{th}$ reception antenna from a $t^{th}$ transmission antenna. The terms $h_{r,t}^{(i)}$, $r_t^{(i)}$, and $n_r^{(i)}$ correspond to channel information, a pilot signal, and Gaussian noise, respectively. Such received signals are expressed as follows in the form of vector-matrix.

$$\begin{bmatrix} y_r^{(0)} \\ y_r^{(2)} \\ y_r^{(3)} \\ y_r^{(4)} \end{bmatrix} = \begin{bmatrix} r_t^{(0)} & 0 & 0 & 0 \\ 0 & r_t^{(1)} & 0 & 0 \\ 0 & 0 & r_t^{(2)} & 0 \\ 0 & 0 & 0 & r_t^{(3)} \end{bmatrix} \begin{bmatrix} h_{r,t}^{(0)} \\ h_{r,t}^{(1)} \\ h_{r,t}^{(2)} \\ h_{r,t}^{(3)} \end{bmatrix} + \begin{bmatrix} n_r^{(0)} \\ n_r^{(1)} \\ n_r^{(2)} \\ n_r^{(3)} \end{bmatrix} \quad (28)$$

Based on the correlation between channel information, the MMSE channel estimation can be expressed as follows.

$$\hat{h}_{r,t} = \text{Cov}(h_{r,t}, y_r) \text{Cov}(y_r, y_r)^{-1} y_r \quad (29)$$

$$= E[h_{r,t} h_{r,t}^H] (E[h_{r,t} h_{r,t}^H] + \sigma_n^2 I)^{-1} R_t^H y_r$$

In the above equation, a correlation function is defined as $\text{Cov}(x,y) = E[xy^H]$, and a channel correlation $E[h_{r,t} h_{r,t}^H]$ can be calculated through the following process. When $h(f,t)$ corresponds to channel information in a frequency-time grid, channel information to be estimated can be expressed as follows in the form of frequency and time.

$$\begin{bmatrix} h_{r,t}^{(0)} \\ h_{r,t}^{(1)} \\ h_{r,t}^{(2)} \\ h_{r,t}^{(3)} \end{bmatrix} = \begin{bmatrix} h(f,t) \\ h(f+\Delta f_1, t+\Delta t_1) \\ h(f+\Delta f_2, t+\Delta t_2) \\ h(f+\Delta f_3, t+\Delta t_3) \end{bmatrix} \quad (30)$$

Based on an assumption of a 2D zero-mean wide-sense stationary process, the channel correlation can be expressed by a change in time and frequency.

$$E[h(f+\Delta f, t+\Delta t)h(f,t)^H] = R_h(\Delta f, \Delta t) \quad (31)$$

Further, the channel correlation can be expressed as follows by using a Clarke's isotropic scattering model.

$$R_h(\Delta f, \Delta t) = R_h(\Delta f) R_h(\Delta t) \quad (32)$$

$$R_h(\Delta f) = \sum_{i=1}^{L} P_i \exp(j2\pi \Delta f \tau_i)$$

In the above equation, $R_h(\Delta t) = J_0(2\pi f_d \Delta t)$, $P_i$ denotes average power of an $i^{th}$ path, $\tau_i$ denotes a delay time, $f_d$ denotes a Doppler frequency, and $J_0(\cdot)$ denotes a 0-th order Bessel.

When the channel correlation is used, the channel estimation can be performed through the process illustrated in a block diagram of FIG. 10.

Referring to FIG. 10, the receiver according to the embodiment includes at least one of an FFT unit 1002, a resource de-mapping unit 1004, a channel estimation unit 1006, an LLR calculation unit 1008, a de-scrambling unit 1010, a channel decoding unit 1012, a scrambling unit 1014, a soft symbol modulation unit 1016, and a virtual RS selection unit 1018.

In the embodiment, the FFT unit 1002 first performs FFT on a received signal and converts the signal into a signal of a frequency band. In the embodiment, the FFT unit 1002 divides the received signal into a pilot signal and a data signal based on information preset or received from the transmitter.

The resource de-mapping unit 1004 de-maps resources.

The channel estimation unit 1006 vectorizes the divided pilot signal and acquire channel information through MMSE estimation.

The LLR calculation unit 1008 calculates an LLR based on at least one of the estimated channel information and the received signal.

The de-scrambling unit 1010 and the channel decoding unit 1012 perform channel decoding by using the calculated LLR.

The decoded signal is modulated to a soft symbol through the scrambling unit 1014 and the soft symbol modulation unit 1016.

$$E[s_t^{(i)}] = \sum_{s \in \Theta} s \underbrace{\prod_{k=1}^{Q} \frac{1}{2}\left(1 + c_{t,k}^i \tanh\left(\frac{L(c_{t,k}^i)}{2}\right)\right)}_{Pr(s)} \quad (33)$$

In the above equation, $\Theta$ denotes a set of symbols in all possible cases and s denotes a symbol in one possible case. Further, $C_{t,k}^i$ denotes one bit of a bit vector corresponding to one symbol. Accordingly, the soft symbol can be acquired by calculating a probability of each symbol through a product of probabilities of bits, multiplying the probability and an actual value of each symbol, and adding the generated values. Through the use of the soft symbol, secondarily statistical characteristics for data symbol errors can be recognized. When the symbol is relatively inaccurate (when a probability value is small), the probability value is close to 0, so the channel estimation is less influenced. However, when the symbol is accurate, the probability value is large, so the channel estimation is more influenced. Such a fact can be reflected in the channel estimation.

At this time, the calculated LLR is used as an extrinsic factor to be combined with a priori information transmitted from the decoding unit, and then an a posteriori LLR is used. The virtual RS selection unit 1018 selects a symbol which can reduce channel information errors from the acquired symbols and perform the channel re-estimation by using the selected symbol. During such a process, the channel estimation can be performed one more times before the first decoding based on an assumption that a priori information is equal to 0. As a result, the performance gain can be acquired during the first iteration process.

In the embodiment, the soft symbol modulation unit 1016 converts the symbol to a soft symbol based on the LLR calculated by the LLR calculation unit 1008 and the LLR output from the decoded signal.

Further, the virtual RS selection unit 1018 calculates mean square errors from the calculated soft symbols and determines data symbols to be used for the channel estimation. More specifically, the channel re-estimation using the acquired soft symbols as virtual RSs as illustrated in FIG. 11. FIG. 11 shows a case where four virtual RSs are used. Four pilot signals and four data signals are as follows.

$$y_r^{(0)} = h_{r,t}^{(0)} r_t^{(0)} + n_r^{(0)} \quad (34)$$
$$y_r^{(1)} = h_{r,t}^{(1)} r_t^{(1)} + n_r^{(1)}$$
$$y_r^{(2)} = h_{r,t}^{(2)} r_t^{(2)} + n_r^{(2)}$$
$$y_r^{(3)} = h_{r,t}^{(3)} r_t^{(3)} + n_r^{(3)}$$

$$z_r^{(0)} = \sum_{i=0}^{T-1} g_{r,i}^{(0)} s_i^{(0)} + n_r^{(0)} \quad (35)$$

$$z_r^{(1)} = \sum_{i=0}^{T-1} g_{r,i}^{(1)} s_i^{(1)} + n_r^{(1)}$$

$$z_r^{(2)} = \sum_{i=0}^{T-1} g_{r,i}^{(2)} s_i^{(2)} + n_r^{(2)}$$

$$z_r^{(3)} = \sum_{i=0}^{T-1} g_{r,i}^{(3)} s_i^{(3)} + n_r^{(3)}$$

In the above equation, $Z_r^{(j)}$ denotes a received signal of an $j^{th}$ pilot position transmitted to an $r^{th}$ reception antenna from each transmission antenna. The terms $g_{r,i}^{(j)}$ and $S_i^{(j)}$ correspond to channel information and a data symbol transmitted from an $i^{th}$ transmission antenna, respectively. A pilot received signal $y_r^{(j)}$ and a virtual RS $z_r^{(j)}$ are vectorized and the MMSE channel estimation is performed as follows.

$$\hat{h}_{r,t} = \text{Cov}\left(h_{r,t}, \begin{bmatrix} y_r \\ z_r \end{bmatrix}\right) \text{Cov}\left(\begin{bmatrix} y_r \\ z_r \end{bmatrix}, \begin{bmatrix} y_r \\ z_r \end{bmatrix}\right)^{-1} \begin{bmatrix} y_r \\ z_r \end{bmatrix} \quad (36)$$

$$= \begin{bmatrix} C_{h,h} & C_{h,g} E[S_t]^H \end{bmatrix} \begin{bmatrix} C_{h,h} + \sigma_n^2 I & C_{h,g} E[S_t]^H \\ E[S_t] C_{g,h} & \sum_{i=0}^{T-1} E[S_i C_{g,g} S_i^H] + \sigma_n^2 I \end{bmatrix}^{-1}$$

-continued $$\begin{bmatrix} R_t^H y_r \\ z_r \end{bmatrix}$$

In the above equation, $C_{h,h}$ denotes the correlation between pilot positions, $C_{h,g}$ and $C_{g,h}$ denotes the correlation between the pilot and the virtual RS, and $C_{g,g}$ denotes the correlation between virtual RSs. Further, $R_t^H$ denotes a diagonal matrix of the pilot signal and $E[S_t]$ denotes a diagonal matrix of the soft symbol using a posteriori information. In the above equation, although only channels of pilot positions are estimated, channels of data positions can be estimated through simple equation calculations. However, in order to reduce the complexity of the interpolation in an actual implementation, such an example of the calculation has been described to increase only the accuracy of the channel of the pilot positions.

The acquired accuracy of the channels can be calculated by a Mean Square Error (MSE) as follows.

$$\begin{aligned} MSE &= E\left[ \left\| h_{r,t} - \hat{h}_{r,t} \right\|^2 \right] \\ &= tr\bigg( C_{h,h} - [C_{h,h} \quad C_{h,g}E[S_t]^H]^{-1} \\ &\quad \begin{bmatrix} C_{h,h} + \sigma_n^2 I & C_{h,g}E[S_t]^H \\ E[S_t]C_{g,h} & \sum_{i=0}^{T-1} E[S_i C_{g,g} S_i^H] + \sigma_n^2 I \end{bmatrix}^{-1} \begin{bmatrix} C_{h,h} \\ E[R_t]C_{g,h} \end{bmatrix} \bigg) \\ &= \sigma_n^2 tr\big(C_{h,h}(C_{h,h} + \sigma_n^2 I)^{-1}\big) - \frac{\sigma_n^4 |E[S_t]|^2 C_{g,h}(C_{h,h} + \sigma_n^2 I)^{-2} C_{h,g}}{\sum_{i=0}^{T-1} E[R_i^2] + \sigma_n^2 -} \\ &\quad |E[S_t]|^2 C_{g,h}(C_{h,h} + \sigma_n^2 I)^{-2} C_{h,g} \end{aligned}$$

(37)

Figure 15:
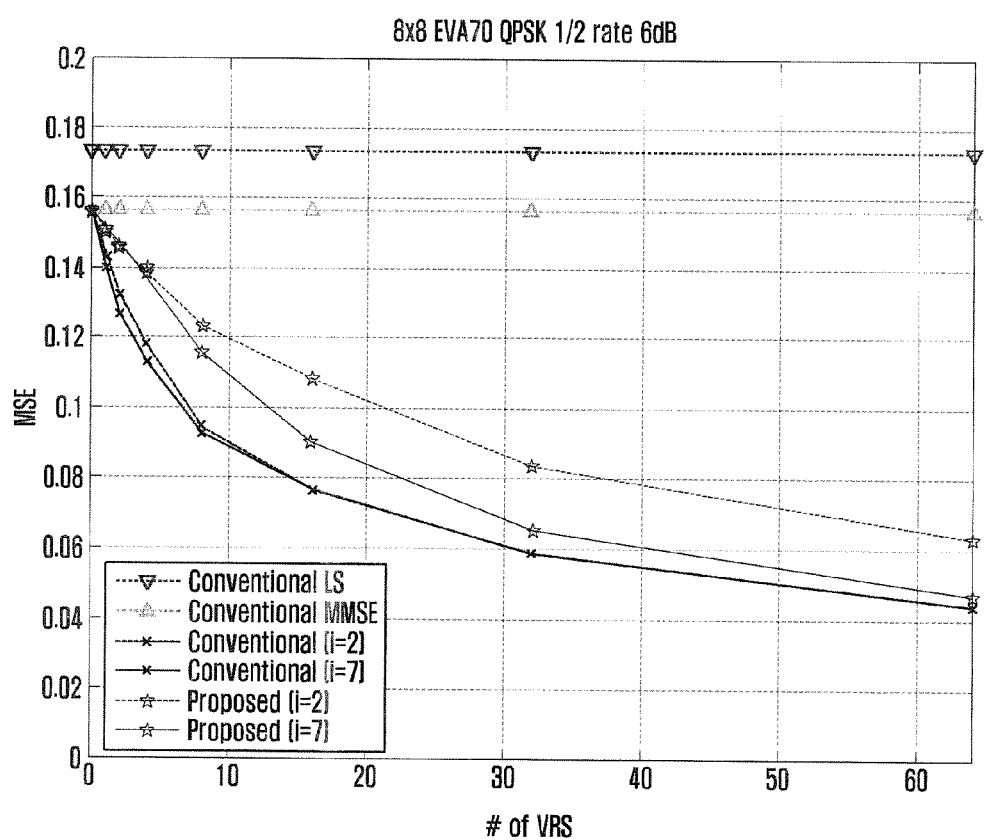
FIG. 15 illustrates an MSE performance compassion result when a virtual RS is applied according to an embodiment of the present disclosure.

A first term of the above equation corresponds to a fixed value according to a given environment, and it is noted that a channel error decreases as a second term becomes larger. Accordingly, as a changeable value of $|E[S_t]|^2 \|C_{g,h}\|^2$ is larger, the channel error becomes smaller. Therefore, a data symbol making the second term have the largest value is selected. As illustrated in FIG. 12, values of $|E[S_t]|^2 \|C_{g,h}\|^2$ for data symbols of one block are calculated, calculated values are sequentially arranged in a descending order, and then as many virtual RSs as needed are selected. The as many virtual RSs as needed can be freely selected, such as a predetermined number of virtual RSs or a number of according to the required performance or complexity. The performance according to each virtual RS is illustrated in FIG. 15 in a MIMO environment. It is noted that the MSE performance is improved but an improvement width of the performance becomes gradually narrower as the number of virtual RSs increases. Further, it is noted that the performance gradually approaches the theoretical performance as the number of iterations increases. As described above, according to the embodiment, the reception performance can be further improved by the interpolation process through vectorized channel estimation based on data symbols. More specifically, through the vectorized channel estimation based on the data symbols, the channel estimation performance based on the pilot signals can be enhanced and the channel estimation performance through the data channels can be improved.

Further, as the MIMO size becomes larger, the size of interference by symbols from other antennas in data symbol positions becomes gradually larger. Accordingly, interference should be considered. The interference can be removed using the data symbols in the previous process and the estimated channel information through the iteration process. Accordingly, through the previously calculated MMSE channel estimation, the improved channel information can be acquired as follows.

$$\begin{bmatrix} \hat{h}_{r,t}^{(1)} \\ \hat{g}_{r,t}^{(1)} \end{bmatrix} = \text{Cov}\left( \begin{bmatrix} h_{r,t}^{(1)} \\ g_{r,t}^{(1)} \end{bmatrix}, \begin{bmatrix} \tilde{y}_r \\ \tilde{z}_r \end{bmatrix} \right) \text{Cov}\left( \begin{bmatrix} \tilde{y}_r \\ \tilde{z}_r \end{bmatrix}, \begin{bmatrix} \tilde{y}_r \\ \tilde{z}_r \end{bmatrix} \right)^{-1} \begin{bmatrix} \tilde{y}_r \\ \tilde{z}_r \end{bmatrix} \quad (38)$$

In the above equation, $$\begin{bmatrix} \tilde{y}_r \\ \tilde{z}_r \end{bmatrix} = \left( \begin{bmatrix} y_r \\ z_r \end{bmatrix} - \sum_{i=0, i \neq t}^{T-1} \begin{bmatrix} R_i & 0 \\ 0 & X_i \end{bmatrix} \begin{bmatrix} \hat{h}_{r,t}^{(l-1)} \\ \hat{g}_{r,t}^{(l-1)} \end{bmatrix} \right),$$

and each correlation is calculated as follows.

$$\text{Cov}\left( \begin{bmatrix} h_{r,t}^{(1)} \\ g_{r,t}^{(1)} \end{bmatrix}, \begin{bmatrix} \tilde{y}_r \\ \tilde{z}_r \end{bmatrix} \right) = \begin{bmatrix} C_{h,h} R_t^H & C_{h,g} E[S_t]^H \\ C_{g,h} R_t^H & C_{g,g} E[S_t]^H \end{bmatrix} \quad (39)$$

$$\text{Cov}\left( \begin{bmatrix} \tilde{y}_r \\ \tilde{z}_r \end{bmatrix}, \begin{bmatrix} \tilde{y}_r \\ \tilde{z}_r \end{bmatrix} \right) = \begin{bmatrix} R_t C_{h,h} R_t^H + \sigma_n^2 I & R_t^H C_{h,g} E[S_t]^H \\ E[S_t] C_{g,h} R_t^H & A \end{bmatrix}$$

In the above equation, A is expressed as follows.

$$A = E[S_t S_t^H] \otimes C_{g,g} + \sum_{i=0, i \neq t}^{T-1} E[S_i S_i^H] \otimes C_{f,f}^{(l-1)} + \quad (40)$$

$$(E[S_i S_i^H] - E[S_i S_i^H]) \otimes \hat{g}_{r,t}^{(l-1)} (\hat{g}_{r,t}^{(l-1)})^H + \sigma_n^2 I$$

In the above equation, ⊗ denotes the Hadamard product in which components of respective matrixes are multiplied.

In the embodiment, when the vectorized channel estimation is performed, channels of radio resources through which downlink data is transmitted can be directly estimated. Further, it is possible to further improve the performance of channel estimation by using the result of the channel estimation of the downlink data transmission resources for estimating channels through which the pilot signals are transmitted.

In scalar type channel estimation, the result of the channel estimation of the radio resources where the downlink data is transmitted cannot be used for estimating the resource regions where the pilot signals are transmitted.

Further, when the vectorized channels are estimated, data channels can be selectively estimated. Accordingly, by selectively estimating several data channels in the interpolation process, the performance improvement desired by a developer can be achieved. More specifically, since the type of selected data channels, the number of selected data channels, and the interpolation process are independent of each other, the complexity of the interpolation process does not increase according to the data channels selected for the channel estimation.

Further, when the vectorized channels are estimated, gains for more accurately estimating the channels can be acquired before the LLR calculation is performed multiple times. More specifically, the channel estimation can be performed one more time before the first decoding based on an assumption that a priori information is equal to 0. As a result, the performance gain can be acquired during the first iteration process.

Further, in vector type channel estimation, when the received data itself has errors, the channel estimation is performed based on soft-symbol type errors, so that a separate error determination is not needed, and thus the channel estimation is less influenced from the errors if the errors exist.

Figure 13:
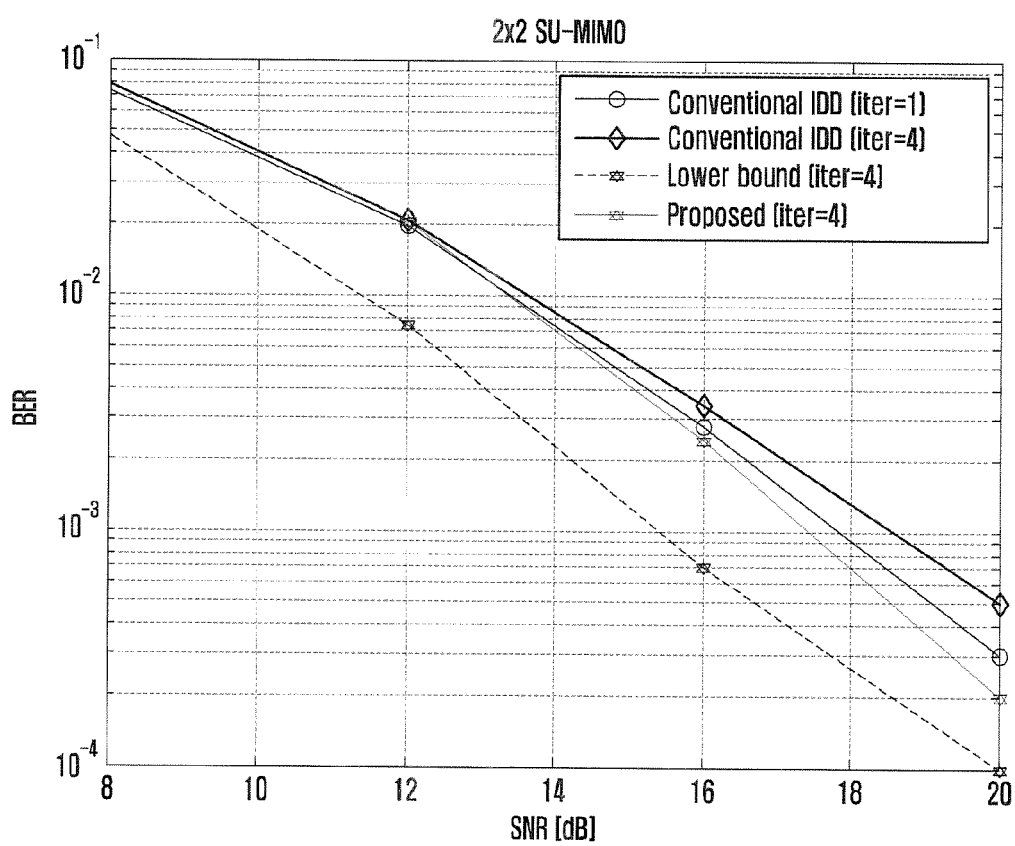
FIG. 13 illustrates a performance comparison result in 2×2 MIMO according to an embodiment of the present disclosure.
Figure 14:
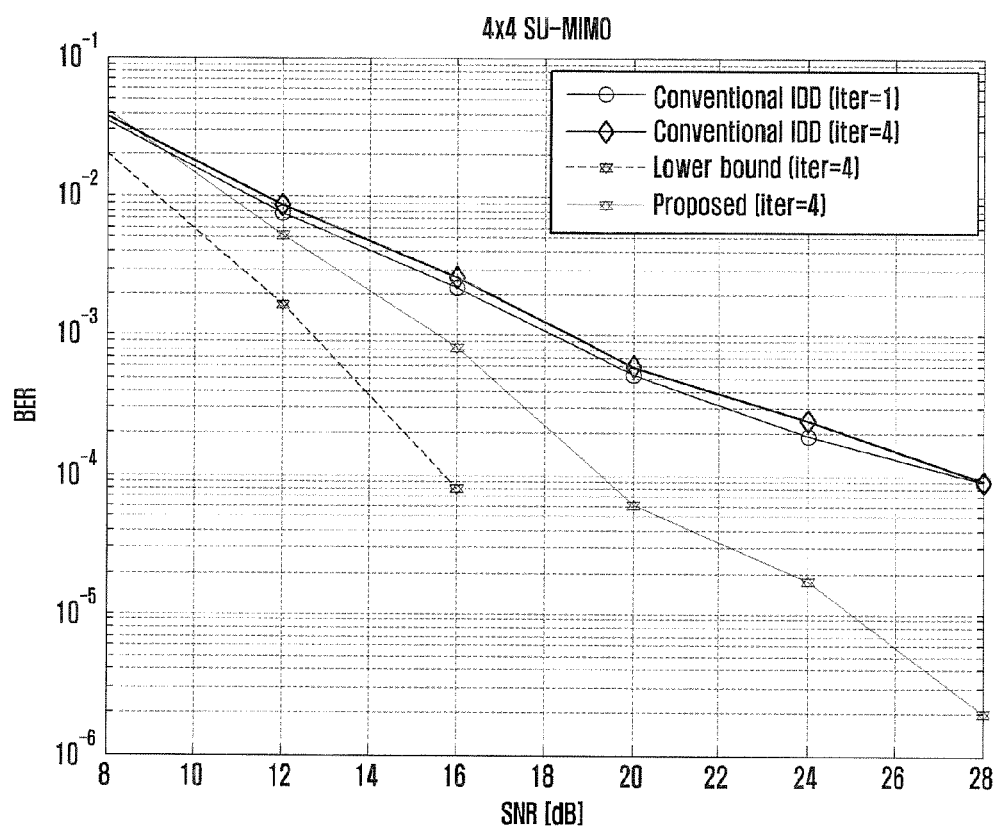
FIG. 14 illustrates a performance comparison result in 4×4 MIMO according to an embodiment of the present disclosure.

FIG. 13 illustrates a performance comparison result in 2×2 MIMO according to an embodiment of the present disclosure and FIG. 14 illustrates a performance comparison result in 4×4 MIMO according to an embodiment of the present disclosure.

Referring to FIGS. 13 and 14, in cases of 2×2 MIMO and 4×4 MIMO, a BER with respect to one iteration time and four iteration times by the receiver according to the conventional IDD and a BER with respect to four iteration times by the receiver according to suggested embodiments of the present disclosure are shown. More specifically, while the accuracy of the LLR calculation is low due to the channel estimation error and thus the performance improvement is not made even though the iteration process is performed in the conventional IDD scheme, the iterative channel re-estimation and decoding scheme according to the present disclosure has the improved performance.

FIG. 15 illustrates an MSE performance comparison result when a virtual RS is applied according to an embodiment of the present disclosure.

Referring to FIG. 15, it is noted that the MSE performance is improved but an improvement width is gradually narrower as the number of virtual RSs increases in an 8×8 MIMO environment. Further, it is noted that the performance gradually approaches the theoretical performance as the number of iterations increases. In the embodiment, i indicates the number of iterations.

Figure 16:
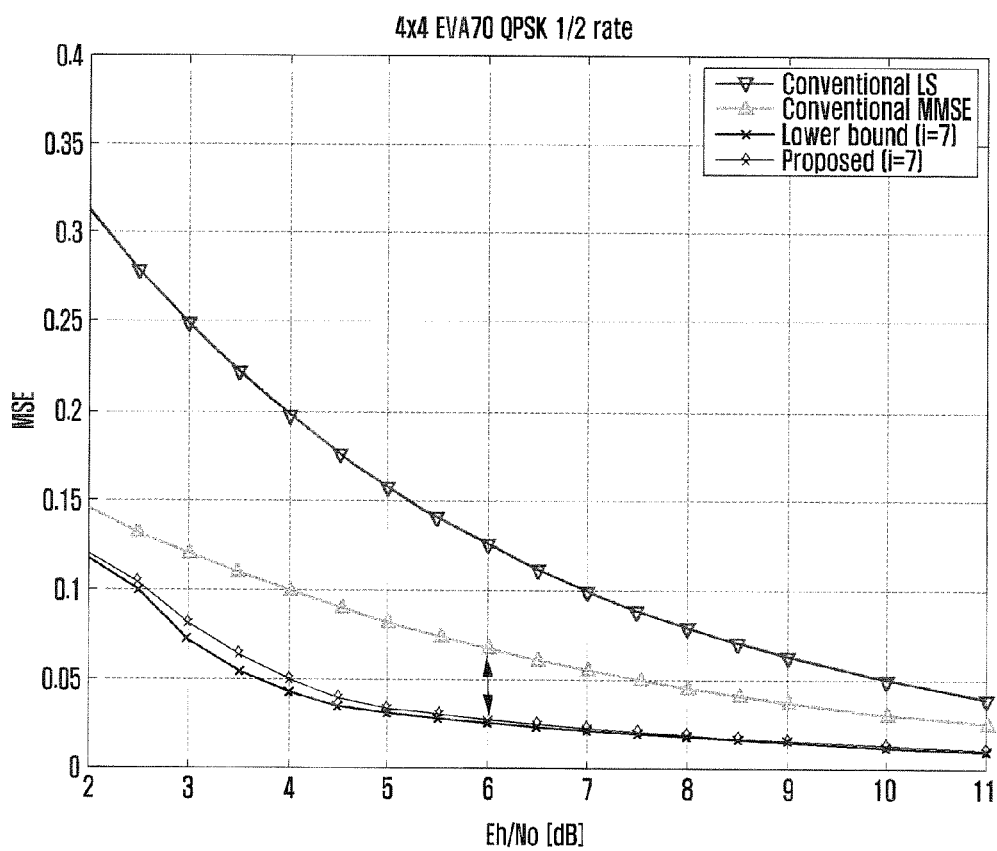
FIG. 16 illustrates an MSE performance comparison result in 4×4 MIMO according to an embodiment of the present disclosure.
Figure 17:
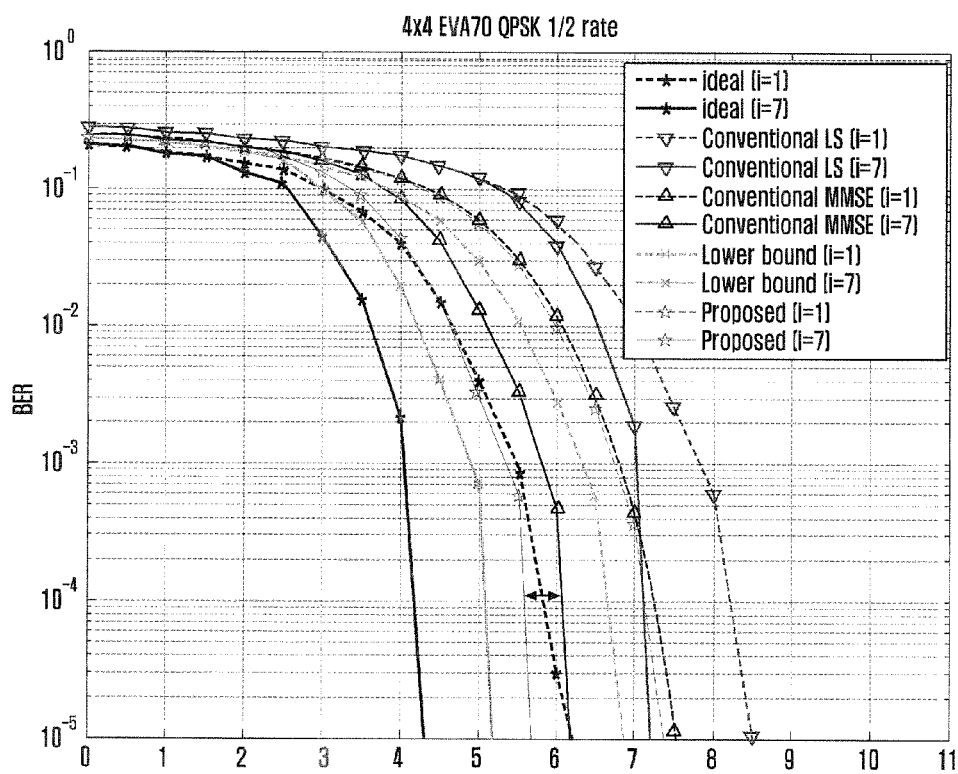
FIG. 17 illustrates a BER performance comparison result in 4×4 MIMO according to an embodiment of the present disclosure.
Figure 18:
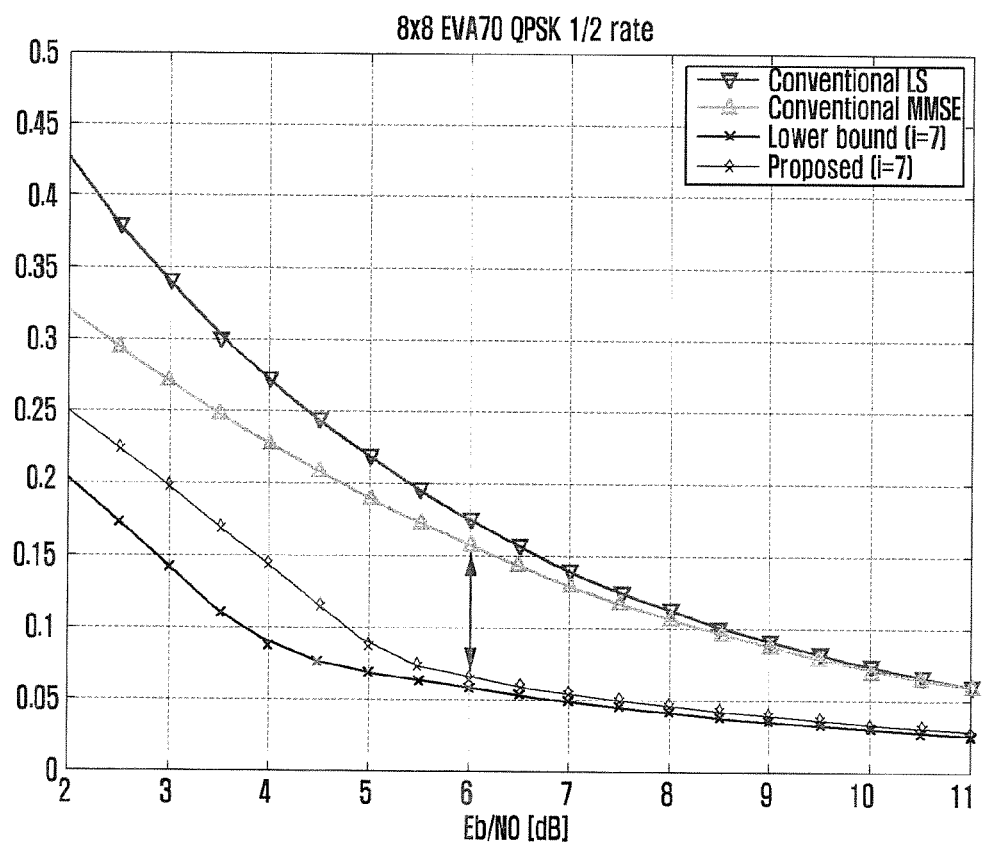
FIG. 18 illustrates an MSE performance comparison result in 8×8 MIMO according to an embodiment of the present disclosure.
Figure 19:
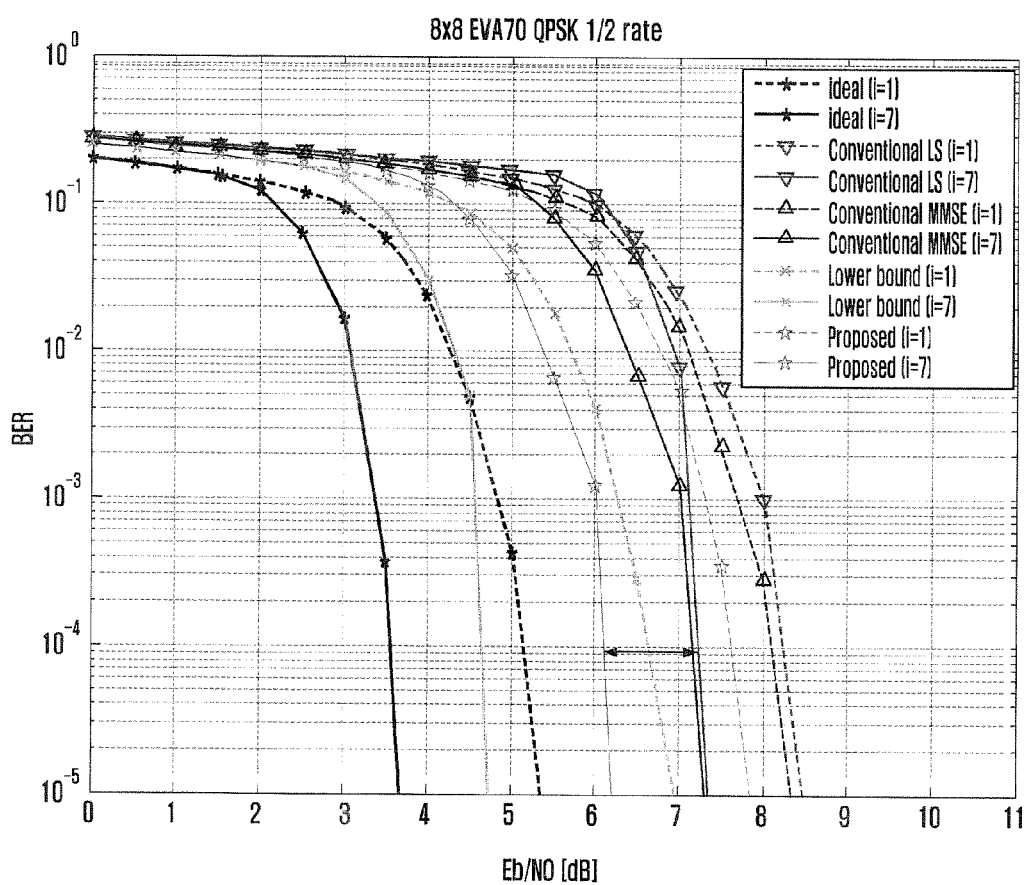
FIG. 19 illustrates a BER performance comparison result in 8×8 MIMO according to an embodiment of the present disclosure.
Figure 20:
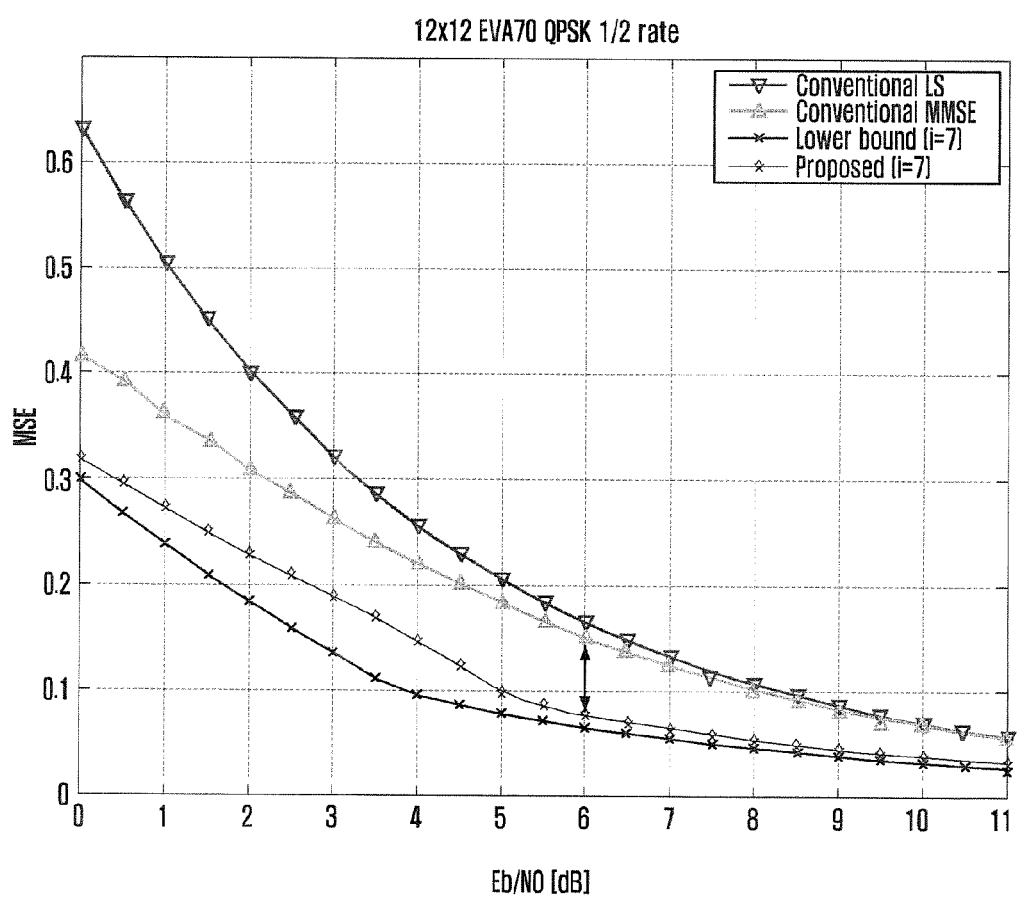
FIG. 20 illustrates an MSE performance comparison result in 12×12 MIMO according to an embodiment of the present disclosure.
Figure 21:
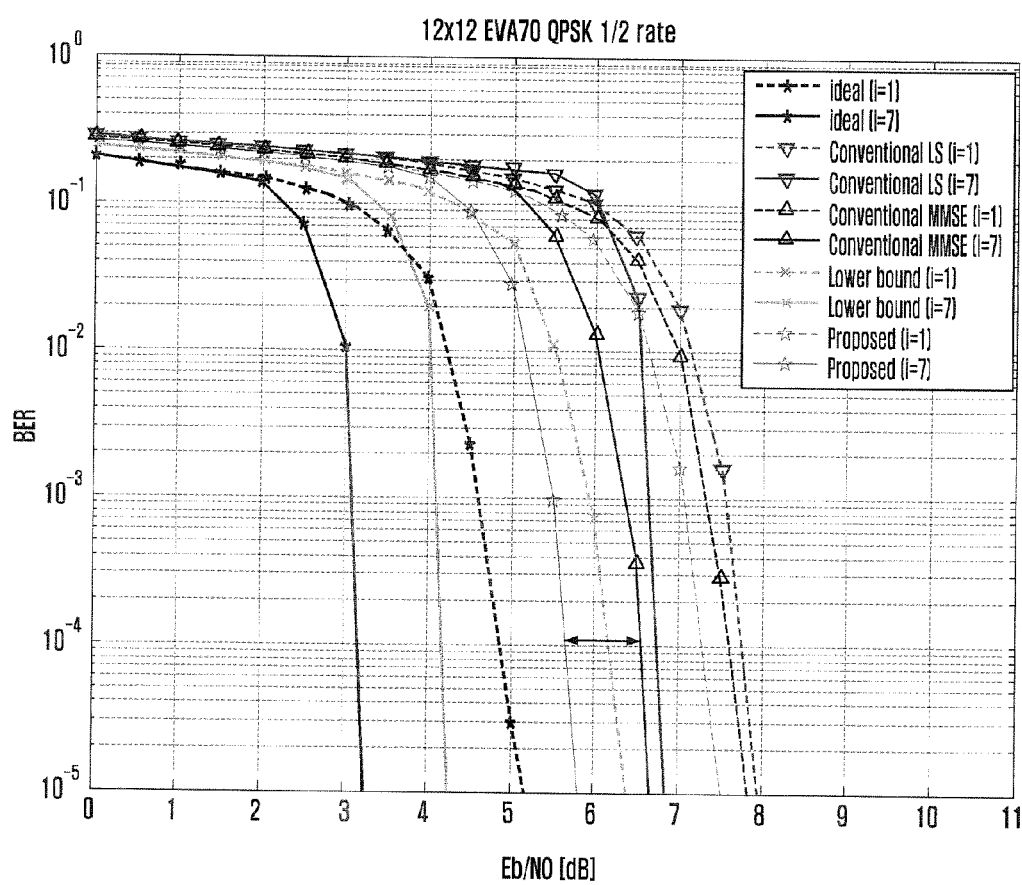
FIG. 21 illustrates a BER performance comparison result in 12×12 MIMO according to an embodiment of the present disclosure.

FIG. 16 illustrates an MSE performance comparison result in 4×4 MIMO according to an embodiment of the present disclosure, FIG. 17 illustrates a BER performance comparison result in 4×4 MIMO according to an embodiment of the present disclosure, FIG. 18 illustrates an MSE performance comparison result in 8×8 MIMO according to an embodiment of the present disclosure, FIG. 19 illustrates a BER performance comparison result in 8×8 MIMO according to an embodiment of the present disclosure, and FIG. 20 illustrates an MSE performance comparison result in 12×12 MIMO according to an embodiment of the present disclosure.

Referring to FIGS. 16 to 20, the MSE and BER are shown as a result of simulation according to a MIMO size. Unlike a case of scalar, even the conventional scheme has the improved performance in the case of vectors. However, it is noted that performance achieved through the suggested scheme is better than the conventional scheme.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of receiving a signal by a receiver in a mobile communication system, the method comprising:
   receiving a reference signal and a data signal from a transmitter;
   estimating first channel information based on the received reference signal;
   decoding the data signal based on the first channel information;
   identifying whether an error is detected in a data symbol included in the decoded data signal;
   estimating second channel information based on the data symbol, if the error is not detected at the data symbol; and
   estimating channel information of a resource area corresponding to the data symbol using another channel information estimated in a resource area adjacent to the resource area corresponding to the data symbol on time and frequency domains, if the error is detected at the data symbol.

2. The method of claim 1, wherein the first channel information includes a first likelihood ratio determined based on the received reference signal, and the second channel information includes a second likelihood ratio calculated based on the received data signal.

3. The method of claim 1, wherein identifying whether the error is detected in the data symbol further comprises determining the data symbol having the error, if the decoded data signal has the error.

4. The method of claim 1, wherein identifying whether the error is detected further comprises determining whether the decoded data signal has the error based on at least one of the first channel information and the second channel information.

5. The method of claim 1, wherein estimating the channel information further comprising omitting a channel estimation in the resource area corresponding to the data symbol.

6. The method of claim 1, further comprising decoding the data signal based on the second channel information.

7. The method of claim 1, wherein estimating of the first channel information comprises:
   vectorizing the received reference signal;
   determining a correlation between channels receiving the reference signal based on the vectorized reference signal; and
   determining the first channel information based on the correlation.

8. The method of claim 2, wherein the decoded data signal is converted to a soft symbol based on the first likelihood ratio and the second likelihood ratio, and wherein third channel information is estimated based on the soft symbol.

9. The method of claim 1, further comprising:
   estimating third channel information based on the second channel information and the received data signal;
   decoding received data signal based on the third channel information; and
   if the decoded data signal does not meet a preset reference, estimating fourth channel information based on the third channel information and the received data signal.

10. An apparatus of a mobile communication system, the apparatus comprising:
    a transmitter configured to receive a reference signal and a data signal; and
    a controller configured to:
    estimate first channel information based on the received reference signal;

decode the data signal based on the first channel information;

identify whether an error is detected in a data symbol included in the decoded data signal;

estimate second channel information based on the data symbol if the error is not detected at the data symbol; and estimate channel information of a resource area corresponding to the data symbol using another channel information estimated in a resource area adjacent to the resource area corresponding to the data symbol on time and frequency domains, if the error is detected at the data symbol.

11. The apparatus of claim 10, wherein the first channel information includes a first likelihood ratio determined based on the received reference signal, and the second channel information includes a second likelihood ratio calculated based on the received data signal.

12. The apparatus of claim 10, wherein the controller is configured to determine the data symbol having the error, if the decoded data signal has the error.

13. The apparatus of claim 12, wherein the controller is configured to determine whether the decoded data signal has the error based on at least one of the first channel information and the second channel information.

14. The apparatus of claim 10, wherein the controller is further configured to omit a channel estimation in the resource area corresponding to the data symbol, if the error is detected at the data symbol.

15. The apparatus of claim 10, wherein the controller is configured to decode the data signal based on the second channel information.

16. The apparatus of claim 10, wherein the controller is further configured to:
vectorize the received reference signal;
determine a correlation between channels receiving the reference signal based on the vectorized received reference signal; and
estimate the first channel information based on the correlation.

17. The apparatus of claim 11, wherein the controller is further configured to:
convert the decoded data signal into a soft symbol based on the first likelihood ratio and the second likelihood ratio; and
estimate third channel information based on the soft symbol.

18. The apparatus of claim 10, wherein the controller is configured to:
estimate third channel information based on the second channel information and based on the received data signal;
decode the received data signal based on the third channel information; and
if the decoded data signal does not meet a preset reference, estimate fourth channel information based on the third channel information and the received data signal.

* * * * *